(12) United States Patent
Da Silveira et al.

(10) Patent No.: US 11,621,811 B2
(45) Date of Patent: *Apr. 4, 2023

(54) ORTHOGONAL TRAINING SIGNALS FOR TRANSMISSION IN AN ANTENNA ARRAY

(71) Applicant: Telefonaktiebolaget LM Ericsson (publ), Stockholm (SE)

(72) Inventors: Martin Da Silveira, Ottawa (CA); Georgy Levin, Ottawa (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/454,959

(22) Filed: Nov. 15, 2021

(65) Prior Publication Data

US 2022/0077903 A1 Mar. 10, 2022

Related U.S. Application Data

(63) Continuation of application No. 16/085,550, filed as application No. PCT/IB2017/056775 on Oct. 31, 2017, now Pat. No. 11,184,065.

(51) Int. Cl.
*H04L 5/00* (2006.01)
*H04B 7/0408* (2017.01)
(Continued)

(52) U.S. Cl.
CPC ......... *H04L 5/0023* (2013.01); *H04B 7/0408* (2013.01); *H04B 7/06* (2013.01); *H04L 5/005* (2013.01); *H04L 27/2613* (2013.01)

(58) Field of Classification Search
CPC ............... H04L 5/0023; H04L 5/005; H04L 27/2613; H04B 7/0408; H04B 7/06
See application file for complete search history.

(56) References Cited

U.S. PATENT DOCUMENTS 5,345,476 A 9/1994 Tsujimoto
5,745,006 A 4/1998 Budnik et al.
(Continued)

FOREIGN PATENT DOCUMENTS

CN 1589536 A 3/2005
CN 1925693 A 3/2007
(Continued)

OTHER PUBLICATIONS

Corrected Notice of Allowability, U.S. Appl. No. 16/642,834, dated Feb. 3, 2021, 3 pages.
(Continued)

*Primary Examiner* — Sophia Vlahos
(74) *Attorney, Agent, or Firm* — Nicholson De Vos Webster & Elliott LLP

(57) ABSTRACT

A method and apparatus for generation of orthogonal training signals for transmission in an antenna array are described. In this embodiment, a set of P training signals is generated. The generation of the P training signals includes generating a first set of Zadoff-Chu sequences, where the first set of sequences is based on a first reference Zadoff-Chu sequence and first subsequent Zadoff-Chu sequences, where each one of the first subsequent Zadoff-Chu sequences is a cyclic shift of the first reference Zadoff-Chu sequence. A second set of sequences is generated based on a second reference sequence and second subsequent sequences that are cyclic shift of the second reference sequence. The P training signals are determined based on the first set of sequences and the second set of sequences. The training signals are then transmitted through a plurality of transmit paths of a base station towards a wireless network.

22 Claims, 10 Drawing Sheets

(51) Int. Cl.
 H04B 7/06 (2006.01)
 H04L 27/26 (2006.01)

(56) References Cited

U.S. PATENT DOCUMENTS

| | | | |
|---|---|---|---|
| 6,615,024 B1 | 9/2003 | Boros et al. | |
| 6,963,742 B2 | 11/2005 | Boros et al. | |
| 7,209,078 B2 | 4/2007 | Jin et al. | |
| 7,286,500 B1 | 10/2007 | Bhatoolaul et al. | |
| 7,292,877 B2 | 11/2007 | Yoon et al. | |
| 7,522,847 B2 | 4/2009 | Momtaz et al. | |
| 8,054,891 B2 | 11/2011 | Kim et al. | |
| 8,107,548 B2 | 1/2012 | Jeong et al. | |
| 8,503,286 B2* | 8/2013 | Kwak | H04L 5/006 370/208 |
| 8,526,526 B2* | 9/2013 | Jeong | H04L 1/0042 375/267 |
| 8,674,874 B2 | 3/2014 | Soualle et al. | |
| 8,929,934 B2 | 1/2015 | Chirayil | |
| 9,025,575 B2 | 5/2015 | McGowan et al. | |
| 9,094,254 B2 | 7/2015 | Da et al. | |
| 10,320,431 B2 | 6/2019 | Wu et al. | |
| 11,184,065 B2* | 11/2021 | Da Silveira | H04B 7/0408 |
| 2004/0125235 A1 | 7/2004 | Kim et al. | |
| 2004/0132414 A1 | 7/2004 | Sendyk et al. | |
| 2004/0204109 A1 | 10/2004 | Hoppenstein | |
| 2004/0214604 A1 | 10/2004 | Yoon et al. | |
| 2004/0228417 A1 | 11/2004 | Kennedy et al. | |
| 2005/0207334 A1 | 9/2005 | Hadad | |
| 2006/0039459 A1 | 2/2006 | Kolze et al. | |
| 2006/0240784 A1 | 10/2006 | Naguib et al. | |
| 2007/0177620 A1 | 8/2007 | Ohmuro et al. | |
| 2007/0230638 A1 | 10/2007 | Griniasty | |
| 2008/0159357 A1 | 7/2008 | Nekoogar et al. | |
| 2008/0225929 A1 | 9/2008 | Proctor et al. | |
| 2009/0247095 A1 | 10/2009 | Pan | |
| 2010/0048146 A1 | 2/2010 | McCallister | |
| 2011/0019694 A1* | 1/2011 | Kwon | H04L 27/2613 370/474 |
| 2012/0001810 A1 | 1/2012 | Soualle et al. | |
| 2012/0147991 A1 | 6/2012 | Matsubara et al. | |
| 2013/0157667 A1 | 6/2013 | Nakamura et al. | |
| 2013/0200951 A1 | 8/2013 | Irvine | |
| 2014/0133470 A1 | 5/2014 | McGowan et al. | |
| 2014/0133543 A1 | 5/2014 | Da et al. | |
| 2015/0244440 A1 | 8/2015 | Da et al. | |
| 2017/0118047 A1 | 4/2017 | Xie et al. | |
| 2019/0319719 A1 | 10/2019 | McGowan et al. | |

FOREIGN PATENT DOCUMENTS

| | | |
|---|---|---|
| CN | 101208828 A | 6/2008 |
| CN | 102396105 A | 3/2012 |
| CN | 104769863 A | 7/2015 |
| WO | 03/90386 A1 | 10/2003 |
| WO | 2009/022866 A1 | 2/2009 |
| WO | 2010/038227 A2 | 4/2010 |
| WO | 2014/076630 A1 | 5/2014 |
| WO | 2014/076631 A1 | 5/2014 |
| WO | 2015/128773 A1 | 9/2015 |

OTHER PUBLICATIONS

Decision to Grant, EP App. No. 17780520.7, dated Oct. 7, 2021, 2 pages.
Intention to Grant, EP App. No. 13802444.3, dated Jun. 23, 2017, 6 pages.
Intention to Grant, EP App. No. 17780520.7, dated May 10, 2021, 8 pages.
Intention to Grant, EP App. No. 17804946.6, dated Dec. 22, 2021, 7 pages.
Office Action, AR App. No. 20180103171, dated Aug. 4, 2021, 5 pages (Original Document Only).
Dongarra, J. and Barrett, R., "Stopping Criteria", Templates for the Solution of Linear Systems: Building Blocks for Iterative Methods, 2nd Edition, retrieved from the Internet: http://www.netlib.org/linalg/html_templates/node83.html#SECTION00920000000000000000, Nov. 20, 1995, 2 pages.
Decision to Grant, EP App. No. 13802443.5, dated Aug. 24, 2017, 2 pages.
Decision to Grant, EP App. No. 13802444.3, dated Jul. 6, 2017, 2 pages.
Ex Parte Quayle Action, U.S. Appl. No. 16/085,550, Apr. 23, 2021, 7 pages.
First Office Action and Search Report from Chinese Patent Application No. 201380059926.1, dated Dec. 24, 2015, 7 pages.
First Office Action, CN App. No. 201810970900.7, dated Sep. 9, 2020, 17 pages (11 pages of English Translation and 6 pages of Original Document).
Intention to Grant, EP App. No. 13802443.5, dated May 31, 2017, 5 pages.
Intention to Grant, EP App. No. 13802444.3, dated Mar. 15, 2017, 5 pages.
International Preliminary Report on Patentability for Application No. PCT/IB2013/060066, dated May 19, 2015, 6 pages.
International Preliminary Report on Patentability for Application No. PCT/IB2013/060067, dated May 19, 2015, 6 pages.
International Preliminary Report on Patentability, PCT App. No. PCT/IB2017/055377, dated Aug. 21, 2019, 20 pages.
International Preliminary Report on Patentability, PCT App. No. PCT/IB2017/056775, dated Jan. 30, 2020, 20 pages.
International Search Report and Written Opinion for Application No. PCT/IB2013/060066, dated Jan. 23, 2014, 10 Pages.
International Search Report and Written Opinion for Application No. PCT/IB2013/060067, dated Jan. 23, 2014, 10 pages.
International Search Report and Written Opinion for Application No. PCT/IB2017/056775, dated Jun. 6, 2018, 12 pages.
International Search Report and Written Opinion, PCT App. No. PCT/IB2017/055377, dated May 25, 2018, 14 pages.
Non-Final Office Action from U.S. Appl. No. 13/677,781, dated Aug. 13, 2014, 18 pages.
Non-Final Office Action from U.S. Appl. No. 13/894,826, dated Dec. 1, 2014, 10 pages.
Non-Final Office Action, U.S. Appl. No. 16/642,834, dated Sep. 18, 2020, 24 pages.
Notice of Allowance from U.S. Appl. No. 13/677,781, dated Jan. 30, 2015, 17 pages.
Notice of Allowance from U.S. Appl. No. 13/894,826, dated Mar. 19, 2015, 7 pages.
Notice of Allowance from U.S. Appl. No. 14/678,045, dated Feb. 13, 2017, 29 pages.
Notice of Allowance, U.S. Appl. No. 13/677,781, dated Mar. 10, 2015, 4 pages.
Notice of Allowance, U.S. Appl. No. 16/085,550, dated Jul. 15, 2021, 5 pages.
Notice of Allowance, U.S. Appl. No. 16/642,834, dated Jan. 13, 2021, 8 pages.
Office Action, EP App. No. 17780520.7, dated Dec. 23, 2020, 7 pages.
Search Report, CN App. No. 201810970900.7, dated Aug. 31, 2020, 2 pages.
Search Report, GN App. No. 201380059926.1, dated Dec. 2, 2015, 2 pages.
Second Office Action from Chinese Patent Application No. 201380059926, dated May 24, 2016, 11 pages.
Thomas T. A., et al., "CSI Reference Signal Designs for Enabling Closed-Loop MIMO Feedback," 2010 IEEE 72nd Vehicular Technology Conference, Fall, Sep. 1, 2010, pp. 1-5.
Written Opinion of the International Preliminary Examining Authority (Chapter-2), PCT App. No. PCT/IB2017/055377, dated May 10, 2019, 7 pages.
Written Opinion of the International Preliminary Examining Authority, PCT App. No. PCT/IB2017/056775, dated Sep. 23, 2019, 4 pages.
Zheng J., et al., "A Novel Timing and Frequency Synchronization Scheme for MIMO OFDM System," Wireless Communications,

(56) References Cited

OTHER PUBLICATIONS

Networking and Mobile Computing, WICOM 2007, International Conference on, Sep. 21, 2007, pp. 420-423.

* cited by examiner

ORTHOGONAL TRAINING SIGNALS FOR TRANSMISSION IN AN ANTENNA ARRAY

CROSS-REFERENCE TO RELATED APPLICATIONS

This application is a continuation of U.S. application Ser. No. 16/085,550, filed Sep. 14, 2018, which is a National stage of International Application No. PCT/IB2017/056775, filed Oct. 31, 2017, which are all hereby incorporated by reference.

TECHNICAL FIELD

Embodiments of the invention relate to antenna array systems; and more specifically, to generation of orthogonal training signals for transmission in an antenna array.

BACKGROUND

Antenna arrays have been widely used in wireless mobile networks for directional signal transmission and reception with an increased gain compared to an omni-directional antenna. The increased gain translates into a higher cell density and data throughput. The sub-arrays of an antenna array are coupled with respective transmit paths within a base station for receiving signals to be transmitted to a wireless network. The transmit paths are calibrated to remove any linear phase and/or amplitude distortions (hereafter simply referred to as phase distortion) that occurs in these paths. If the transmission beam pattern is out of phase or otherwise phase-distorted, the signal transmitted by the antenna array of the base station (e.g., a radio base station (RBS)) at normal transmission power may not be correctly received and decoded by a user terminal. To compensate for the phase distortions, the base station may transmit data at a higher power level; however, increasing the transmission power acts as a load to the system, causing a reduction to the power that can be allocated to other terminals. In addition, the signal transmitted at higher power may interfere with other terminals, causing a reduction in signal quality. In addition, a status of the transmit paths and their associated sub-arrays can be determined during a "branch supervision" process. Branch supervision enables the determination of one or more metrics for detection of faults in a transmit path.

Several techniques exist for antenna array calibration and branch supervision. In some techniques, special training signals are specially selected to be injected into the antenna array to perform the calibration and/or the branch supervision. In these techniques, the signals are selected with controlled and known signal properties. Some of these techniques supervision rely on the analysis of a feedback signal that is a combination of signals after they have traversed the transmit paths of the base station. In these techniques, the determination of the impairment function that affects the signals within the transmit paths (prior to calibration) or the determination of the metrics used for fault detection in the transmit paths use the sampling and generation of a set of linear equations.

To solve the set of linear equations an inversion of a matrix or pseudo matrix inversion is performed. In Advanced Antenna Systems (AAS), where the number of sub-arrays is large (e.g., an antenna may include 16 sub-arrays, 32 sub-arrays, or more) the matrix inversion or pseudo inversion can be computational and memory intensive. In addition, in some techniques, the training signals used for performing the calibration or branch supervision need to be stored in memory at the base station. Thus, depending on the number of transmit paths of the base station the number training signals can be large requiring a significant amount of storage size at the base station.

SUMMARY

Embodiments of the invention enable the generation of orthogonal training signals for transmission in an antenna array of a base station. The antenna array includes a plurality of sub-arrays coupled to transmit paths for transmitting outbound traffic signals to a wireless network. The orthogonal training signals can be used to perform calibration of the transmit paths of the base station and/or branch supervision of each transmit path.

One general aspect includes a method in a base station including a plurality of P transmit paths coupled with a plurality of sub-arrays of an antenna array for transmitting signals to a wireless network, the method including: generating a set of P training signals, where generating the set of P training signals includes: generating a first reference Zadoff-Chu sequence, where the first reference Zadoff-Chu sequence is of length N, where N indicates a number of fast Fourier transform (FFT) bins and N is a prime number that is greater than or equal to the number P of transmit paths; generating (P−1) first subsequent Zadoff-Chu sequences, where each one of the first subsequent Zadoff-Chu sequences is a cyclic shift of the first reference Zadoff-Chu sequence, and where a cyclic shift between two consecutive sequences from the first set is an integer that is smaller than or equal to the number N of FFT bins divided by the number P of transmit paths, where the first reference Zadoff-Chu sequence and the (P−1) first subsequent Zadoff-Chu sequences form a first set of P first sequences; generating a second reference Zadoff-Chu sequence of length Neq, where Neq indicates a number of FFT frames and Neq is a prime number that is greater than or equal to the number P of transmit paths; generating (P−1) second subsequent Zadoff-Chu sequences, where each one of the second subsequent Zadoff-Chu sequences is a cyclic shift of the second reference Zadoff-Chu sequence, and where a cyclic shift between two consecutive sequences from the second set is an integer that is smaller than or equal to the number of FFT frames Neq divided by the number P of transmit paths, where the second reference Zadoff-Chu sequence and the (P−1) second subsequent Zadoff-Chu sequences form a second set of P second sequences; and determining the set of P training signals based on the first set of first sequences and the second set of second sequences. The method also includes transmitting each one of the P training signals through a transmit path from the plurality of transmit paths of the base station towards a wireless network.

One general aspect includes a base station including a plurality of P transmit paths coupled with a plurality of sub-arrays of an antenna array for transmitting signals to a wireless network, the base station including: an orthogonal training signal generator that is operative to: generate a set of P training signals, where to generate the set of P training signals includes: to generate first reference Zadoff-Chu sequence, where the first reference Zadoff-Chu sequence is of length N, where N indicates a number of fast Fourier transform (FFT) bins and N is a prime number that is greater than or equal to the number P of transmit paths; to generate (P−1) first subsequent Zadoff-Chu sequences, where each one of the first subsequent Zadoff-Chu sequences is a cyclic shift of the first reference Zadoff-Chu sequence, and where a cyclic shift between two consecutive sequences from the first set is an integer that is smaller than or equal to the number N of FFT bins divided by the number P of transmit paths, where the first reference Zadoff-Chu sequence and the (P−1) first subsequent Zadoff-Chu sequences form a first set of P first sequences; to generate a second reference Zadoff-Chu sequence of length Neq, where Neq indicates a number of FFT bins frames and Neq is a prime number that is greater than or equal to the number P of transmit paths; to generate (p−1) second subsequent Zadoff-Chu sequences, where each one of the second subsequent Zadoff-Chu sequences is a cyclic shift of the second reference Zadoff-Chu sequence, and where a cyclic shift between two consecutive sequences from the second set is an integer that is smaller than or equal to the number of FFT frames Neq divided by the number P of transmit paths, where the second reference Zadoff-Chu sequence and the (P−1) second subsequent Zadoff-Chu sequences form a second set of P second sequences; and to determine the set of P training signals based on the first set of first sequences and the second set of second sequences. The orthogonal training signal generator is also operative to transmit each one of the P training signals through a transmit path from the plurality of transmit paths of the base station towards a wireless network.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DESCRIPTION OF EMBODIMENTS

Figure 1:
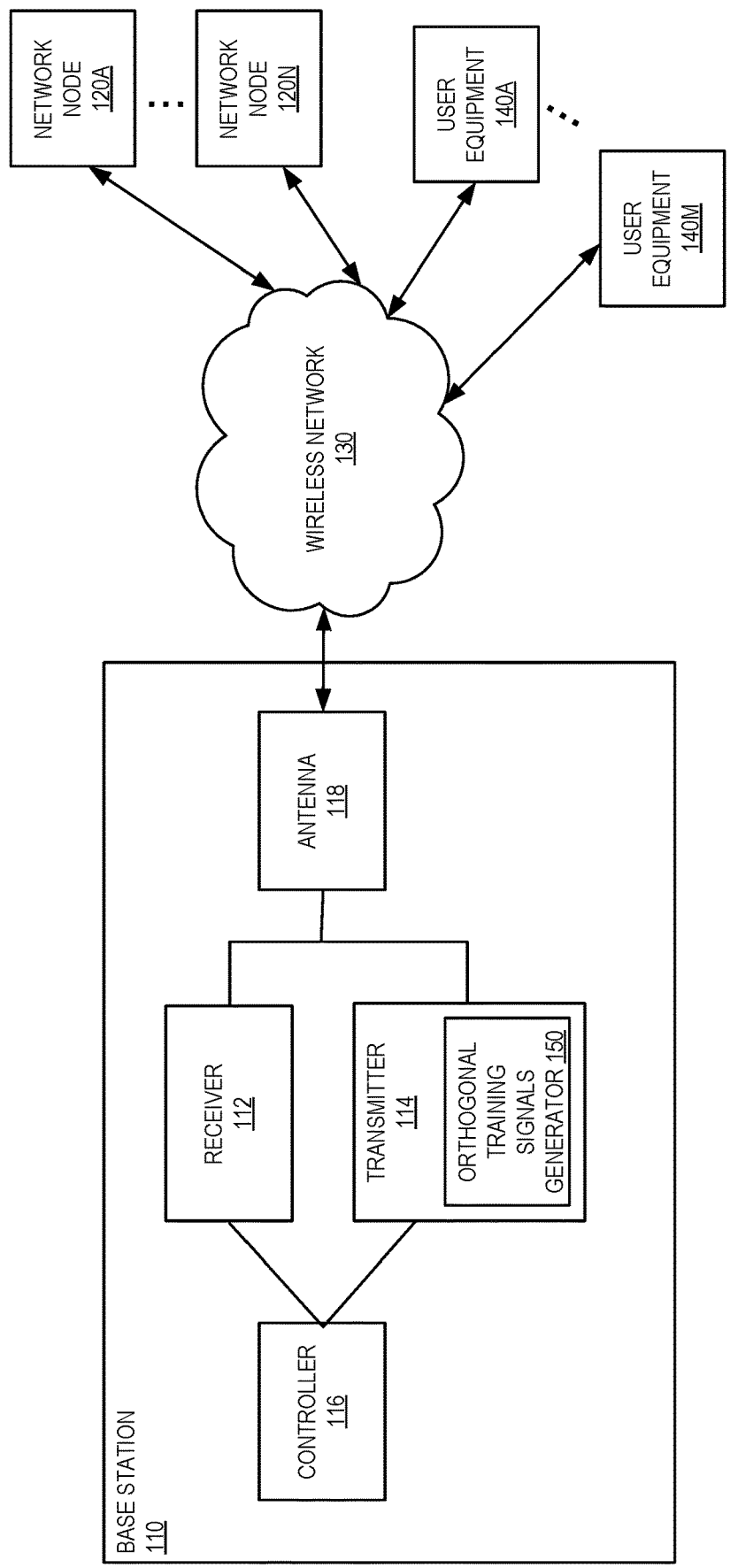
FIG. 1 illustrates a block diagram of an exemplary network architecture in accordance with some embodiments.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Embodiments of the invention provide for orthogonal training signals that are generated for transmission from a base station through an antenna array including multiple sub-arrays. In the following description, the orthogonality of the training signals can be obtained in the time domain, in the frequency domain, and/or both the time and the frequency domains. In some embodiments, the training signals can be used for performing an efficient calibration of the antenna array in the transmit direction. In other embodiments, the training signals can be used to perform branch supervision of each of the transmit path coupled with sub-arrays of the antenna array. In some embodiments, the same set of signals can be used for performing calibration and branch supervision. In other embodiments, different sets of signals may be generated for performing calibration and branch supervision independently. As will be apparent from the following description, this approach allows for a more efficient calibration and branch supervision by minimizing the computational and memory resources needed for generation and processing of training signals that are during the calibration and/or the branch supervision processes.

According to a first embodiment, the training signals generated are orthogonal in the frequency domain as well as in the time domain. These signals can be referred to as time-frequency orthogonal training signals. In this embodiment, a set of P training signals is generated. The generation of the P training signals includes generating a first reference Zadoff-Chu sequence, where the first reference Zadoff-Chu sequence is of length N, where N indicates a number of Fast Fourier Transform (FFT) bins and N is a prime number that is greater than or equal to the number P of transmit paths; generating (P−1) first subsequent Zadoff-Chu sequences, where each one of the first subsequent Zadoff-Chu sequences is a cyclic shift of the first reference Zadoff-Chu sequence, and a cyclic shift between two consecutive sequences from the first set is an integer that is smaller than or equal to the number N of FFT bins divided by the number P of transmit paths, where the first reference Zadoff-Chu sequence and the (P−1) first subsequent Zadoff-Chu sequences form a first set of P first sequences. The generation of the training signals further includes: generating a second reference Zadoff-Chu sequence of length Neq, where Neq indicates a number of FFT frames and Neq is a prime number that is greater than or equal to the number P of transmit paths, generating (P−1) second subsequent Zadoff-Chu sequences, where each one of the second subsequent Zadoff-Chu sequences is a cyclic shift of the second reference Zadoff-Chu sequence, and where a cyclic shift between two consecutive sequences from the second set is an integer that is smaller than or equal to the number of FFT frames Neq divided by the number P of transmit paths, where the second reference Zadoff-Chu sequence and the (P−1) second subsequent Zadoff-Chu sequences form a second set of P second sequences. The generation of the training signals further includes determining the set of P training signals based on the first set of sequences and the second set of sequences. The training signals are then transmitted through a plurality of transmit paths of a base station towards a wireless network. The training signals can be used to perform branch supervision and/or calibration of the transmit paths within the base station.

According to some embodiments, the training signals are generated to be orthogonal in the frequency domain only. In other embodiments, the training signals are generated to be orthogonal in the time domain only.

The embodiments described herein enable calibration techniques and branch supervision techniques that have several advantages when compared with existing calibration techniques. The use of the orthogonal training signals enables the elimination of the inversion of matrix or pseudo inversion of matrix that was previously performed for the solution of the transfer function saving computation time and memory. Further, only two sets of Zadoff-Chu sequences are used to solve the transfer function of all the transmit paths which greatly simplifies the implementation of the impairment function estimation and minimize the memory needed. The orthogonality of the training signals provides improved measures of signal-to-interference-plus-noise ratio (SINR) for the estimation of the transfer function. The set of training signals can be used for both antenna calibration and branch supervision. Each of the training signals has a low peak to average power ratio (i.e. the signals have a well behaved time response when used in a transmit path). In some embodiments, the training signals are generated in the frequency domain, which ensures a good signal level for a transfer function estimation across frequency.

FIG. 1 illustrates a block diagram of an exemplary network architecture in which an embodiment of the invention may operate. A base station 110, such as an RBS, is coupled to one or more network nodes 120A-N (e.g., other base stations) and/or one or more user equipment 140A-M (e.g., mobile phones, tablets, Internet of Things (IoT) devices, etc.) via a wireless network 130. The wireless network 130 operates in compliance with a wireless communication standard, such as 5G, 4G, LTE, GSM, CDMA, WCDMA, etc. The base station 110 includes a receiver 112, a transmitter 114, both of which are coupled to an antenna 118 for signal transmission and reception. The receiver 112 and the transmitter 114 may also be coupled to a controller 116 that controls the transmission and reception operations. It is understood that the base station 110 of FIG. 1 is a simplified representation; additional circuitry may be included in a base station that performs the antenna array calibration described herein. The transmitter 114 includes an orthogonal training signals generator (OTSG) 150 that is operative to generate a set of P training signals that are orthogonal to one another. The orthogonality of the training signals can be achieved in the frequency domain only, in the time domain only or in both the frequency and the time domains simultaneously. The generated training signals can be used to perform calibration and/or branch supervision within the transmit paths of the base station.

Figure 7:
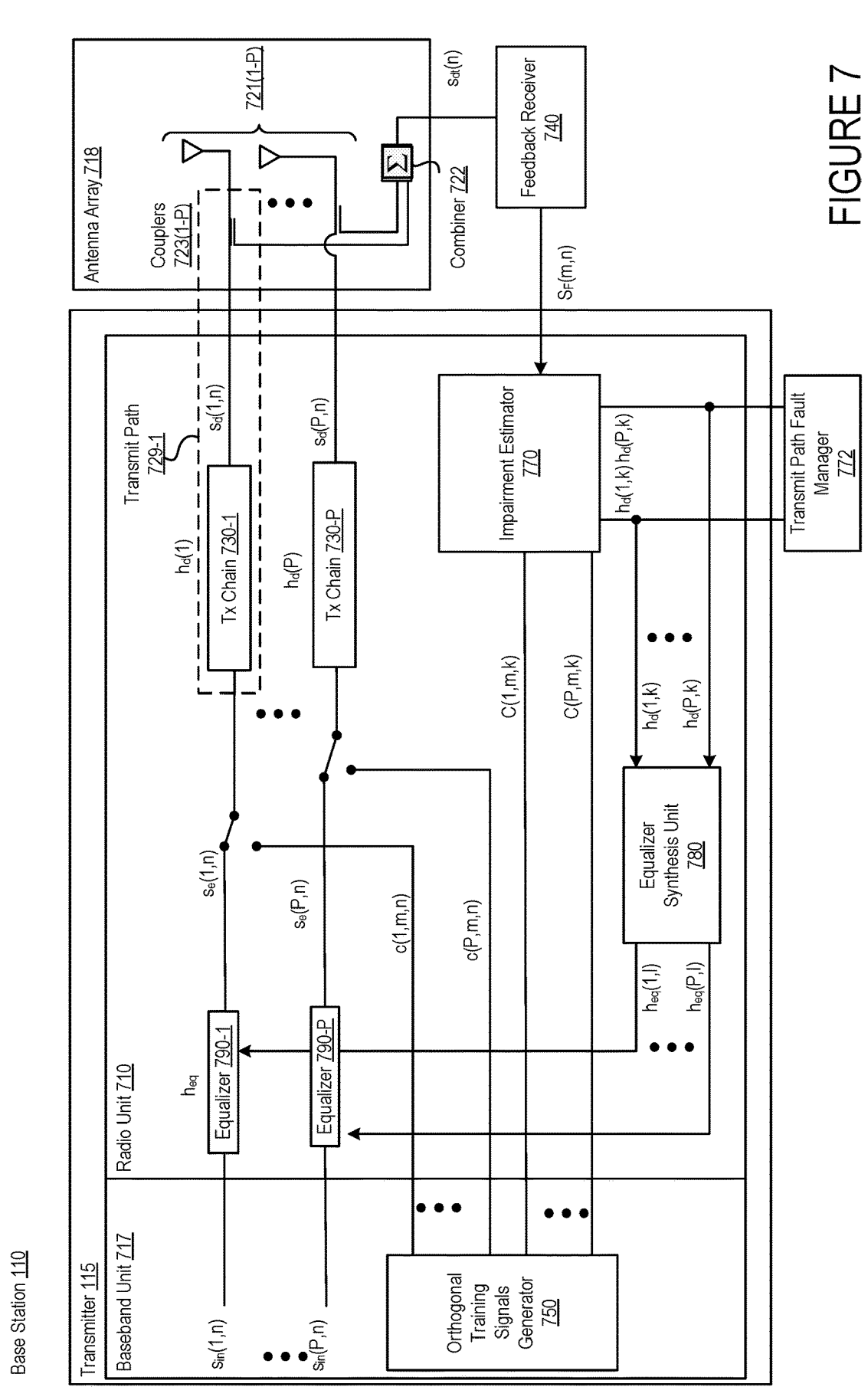
FIG. 7 illustrates an exemplary block diagram of a portion of a transmitter in a base station that performs antenna array calibration and/or branch supervision according to some embodiments.

The transmitter 114 includes ports multiple transmit paths (not illustrates in FIG. 1). The term "transmit path" as used herein refers to the path traversed by a signal after the signal enters a transmit (Tx) chain and before the signal enters one or more sub-arrays from the antenna 118. In some embodiments, each transmit path is coupled with a single sub-array of the antenna 118. In other embodiments, a transmit path may be spitted to multiple sub-arrays of the antenna 118. In practice a transmit path may also include duplexers, amplifiers (e.g., tower mounted amplifiers (TMAs), combiners, diplexers, etc., such as would be appreciated by one skilled in the art. There is a one-to-one correspondence between a transmit chain and a transmit path. The transmit chains are the boundary between digital processing and analog processing in the base station 110, as each one of the transmit chains converts a signal from digital to analog. Each one of the transmit chains includes a number of analog components, such as one or more digital-to-analog converters, mixers, filters, power amplifiers, etc. The analog components in the transmit chains, together with the feeders and other components along the analog portion of the transmit paths up to the antenna ports, generally cause linear phase and/or linear amplitude impairment to the signals that traverse these paths. An example of a transmit path is shown in FIG. 7 by the dotted box labeled as a transmit path 729-1. In this example, the transmit path 729-1 includes a transmit (Tx) chain 730-1 and all of the interconnect including a feeder (not illustrated) up to a coupler 723-1 inside the antenna array 118.

Figure 2:
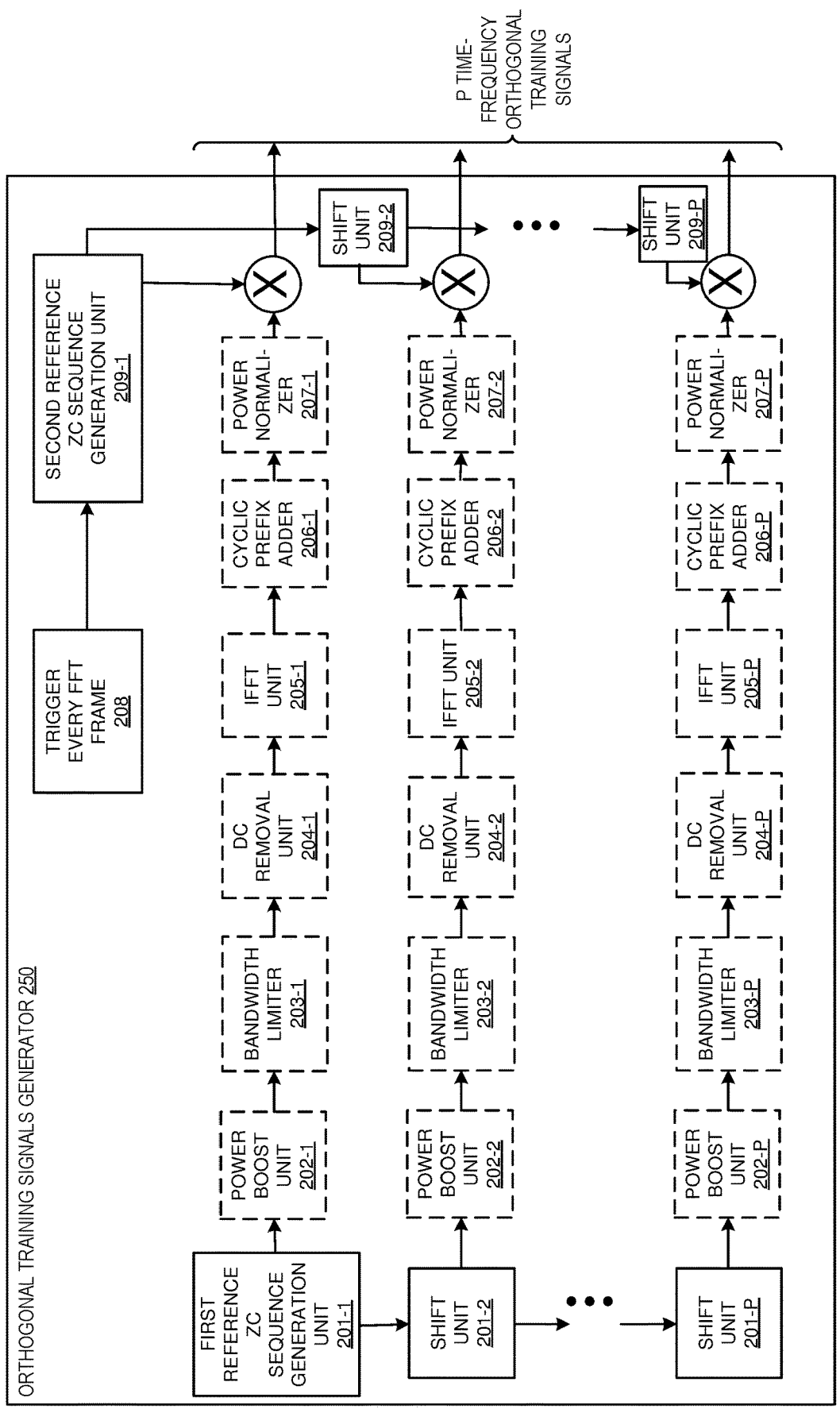
FIG. 2 illustrates a block diagram of an exemplary orthogonal training signals generator for generating orthogonal training signals in accordance with a first embodiment.

FIG. 2 illustrates a block diagram of an exemplary orthogonal training signals generator (OTSG) 250 used for generating orthogonal training signals in accordance with a first embodiment. In this first embodiment, the generated orthogonal training signals are P signal that are orthogonal to one another in both the time and the frequency domains.

The OSTC 250 includes a first reference Zadoff-Chu (ZC) sequence generation unit 201-1. The first reference ZC generation unit 201-1 is operative to generate a first reference ZC sequence $Z_1$ of length N, with parameters $u_1$ and $q_1$. In some embodiments, the sequence $Z_1$ is generated according to the following equation (1):

$$Z_1 = e^{\left(-j\frac{\pi(u_1[0:N-1])([0:N-1]+1+2q_1)}{N}\right)}. \qquad \text{equation (1)}$$

where N indicates a number of Fast Fourier Transform (FFT) bins selected for the sequence $Z_1$. In some embodiments, the number N is a prime number that is greater or equal to the number P of transmit paths in the transmitter 118. In some embodiments, the first parameters $u_1$ is an integer than is smaller than N, $0<u_1<N$, and $q_1$ is any integer number. The sequence $Z_1$ is a signal generated at the first reference ZC generation unit 201-1 according to equation (1).

The sequence $Z_1$ is used as a reference signal to generate additional (P−1) ZC sequences by cyclically shifting $Z_1$ with a shift step size:

$$Step_{size} = \left\lfloor \frac{N}{P} \right\rfloor,$$

where $\lfloor N/P \rfloor$ is the floor function applied to N/P, N is a prime number that is greater or equal to the number P of transmit paths of the transmitter 118, and P is the number of transmit paths. The cyclic shift is applied by each one of the Shift units 201-2 to 201-P to generate the (P−1) ZC sequences based on the first reference $Z_1$ sequence. The cyclic shift between two consecutive sequences from the first set of sequences (where the first set of sequences includes the first reference sequence and the additional ZC sequences) is an integer that is smaller than or equal to the number N of FFT bins divided by the number P of transmit paths.

Thus, for each i an integer between 2 and P, the sequence $Z_i$ is generated based on the following equation (2):

$$Z_i = \text{circular\_shift}(Z_1, i^* \lfloor N/P \rfloor) \quad \text{equation (2)}$$

Where $\lfloor N/P \rfloor$ is the floor function as applied to N/P and the result of the floor function is an integer that is smaller than or equal to the number N of FFT bins divided by the number P of transmit paths.

In some embodiments, when the sequences $Z_1 \ldots Z_P$ from the first set of first sequences are generated in the frequency domain (as per equation (1) and equation (2)) these sequences are transformed into the time domain by applying an Inverse FFT (IFFT) over the N FFT bins. The IFFT is applied by the IFFT unit 205-i to each corresponding $Z_i$ sequence in the frequency domain to obtain the sequence $z_i$ in the time domain. Thus, the following set of sequences is generated:

$$Z_i = \text{IFFT}(Z_i), \quad \text{equation (3)}$$

where IFFT is over N FFT bins.

In other embodiment, the first set of sequences is generated in the time domain (e.g., referred to as sequences $z_i$) and the operation of applying an IFFT on the signals is not performed. In this embodiment, the units 205-1 to 205-P may not be implemented in the OTSG 250 or alternatively they may be disabled such that the sequences $z_i$ are not processed at these units. The first reference sequence $z_1$ is a ZC sequence of parameters $u_1$ and $q_1$ is generated in the time domain. The circular shift applied by each one of the Shift units 201-1 to 201-P is a shift in the time domain and results in obtaining a set of ZC sequences $z_i$, for i=2 . . . P, in the time domain. In the embodiments described herein upper case variables (such as $Z_i$) are used to refer to signals that are expressed in the frequency domain, while lower case variables (such as $z_i$) are used to refer to signals that are expressed in the time domain.

In some embodiments, prior to determining the P training signals based on the first set of sequences $\{z_i, i=1 \ldots P\}$ and a second set of sequences $\{D_i, i=1 \ldots P\}$ several operations can be performed on each one of the first sequences $z_i$. These additional operations are performed for each sequence $z_i$ by a respective one of the power boost units 202-i, the bandwidth limiters 203-i, the DC removal units 204-i, the cyclic prefix adder 206-i, and the power normalizer 207-i. In some embodiments, none of these operations is performed. In other embodiments, a subset or all the operations are performed without departing from the scope of the present invention.

In the following description, the operations will be described with respect to a single sequence $Z_i$, however one of ordinary skill in the art would understand that the same operations are performed for each one of the first sequences $Z_i$, for i=1 . . . P. In the power boost unit 202-i, the power level of the some of the FFT bins of the sequence $Z_i$ are boosted to improve the signal to noise ratio of those bins. For example, in some embodiments, the FFT bins of the sequence that are close to the edges of the bandwidth occupied (Noc) are boosted.

The sequence Zi is then transmitted to the bandwidth limiter 203-i that is operative to limit the frequency band of the sequence based on the Noc. As mentioned above, Noc indicates the number of FFT bins of the sequence that are within the bandwidth of a digital transmit path. The number Noc is usually narrower than the Nyquist bandwidth. In the first embodiment, when the sequence $z_i$ is generated in the time domain, the frequency band can be limited by applying a digital filter with a desired bandwidth in the time domain. Alternatively, when the sequence $Z_i$ is generated in the frequency domain, the frequency band can be limited by applying a digital filter with a desired bandwidth in digital frequency domain. For example, this can be performed by nullifying FFT bins of the sequence $Z_i$ that are outside of the occupied bandwidth and keeping the remaining of the FFT bins unchanged.

In some embodiments, the bandwidth limited 203-i limits the frequency band of the sequence $Z_i$ for i=1 . . . P to contain Noc occupied FFT bins according to the following equations:

The Noc is determined based on the following equation (4)

$$Noc = \lceil \text{Carrier\_Bandwith}^*s/\text{Nyquist Sampling\_Rate}^*N) \rceil \quad \text{equation (4),}$$

where the carrier_bandwitdh is the bandwidth of the carrier wave of the transmit path, and s is a parameter that can have a value of 0.9. Other values of s can be contemplated.

Depending on whether Noc is even or odd, the sequence frequency band of the sequence $Z_i$ is limited according to equation (5) or equation (6) respectively:

$$Z_i = [Z_i(1:Noc/2), \text{zero}(N-Noc), Z_i(N-Noc/2+1:N)] \quad \text{equation (5)}$$

when Noc is even.

$$Z_i = [Z_i(1:(Noc+1)/2), \text{zero}(N-Noc), Z_i(N-(Noc-1)/2+1:N)] \quad \text{equation (6)}$$

when Noc is odd.

In some embodiments, the transmitter 118 is not DC coupled and the DC FFT bin of a sequence $Z_i$ is removed. The DC removal unit 204-i removes the DC FFT bin of a sequence $Z_i$ by causing the FFT bin at the index 0 of the sequence $Z_i$ to be null, i.e. $Z_i(0)=0$.

In some embodiments, as discussed above when the sequences are generated in the frequency domain they are transformed by the IFFT units 205-1 to 205-P into sequences $z_i$ in the time domain. This can be performed following the processing of the sequences $Z_i$ in the power boost units 202-i, the bandwidth limiters 203-i, and the DC removal units 204-i and prior to their processing in the cyclic prefix adders 206-i.

Following the conversion of the sequences $Z_i$ into sequences $z_i$ expressed in the time domain, a cyclic prefix (CP) is added to the sequences by the cyclic prefix adder 206-i. The cyclic prefix is a copy of last cyclic prefix samples in the time domain signal added to the beginning of the signal (i.e., the beginning of the sequence $z_i$):

$$z_i = [z_i(N-CP+1:N), z_1(1:N)] \quad \text{equation (7)}$$

In some embodiments, the amplitude of sequences $z_i$ is scaled to a defined power level.

Once the first set of sequences has been generated and processed, the first set of $z_i$ sequences for i=1 . . . P are obtained and expressed in the time domain. A second set of sequences $D_i$ (for i=1 . . . P) is generated at the OTSG 250 to be used in combination with the sequences $z_i$ to determine the P orthogonal training signals. In a similar manner to the first set of first sequences $z_i$, the second set of second sequences $D_i$ is generated based on a reference Zadoff-Chu sequence $D_1$ and circular shift applied to this second reference sequence to obtain the subsequent (P−1) second sequences.

The OSTC 250 includes a second reference Zadoff-Chu (ZC) sequence generation unit 209-1. The first reference ZC generation unit 201-1 is operative to generate a second reference ZC sequence $D_1$ of length $N_{eq}$, with parameters $u_2$ and $q_2$. In some embodiments, D1 is generated according to the following equation (8):

$$D_1 = e^{\left(-j\frac{\pi(u_2[0:N_{eq}-1]([0:N_{eq}-1]+1+2q_2))}{N_{eq}}\right)} \quad \text{equation (8)}$$

where $N_{eq}$ indicates a number of FFT frames selected for the sequence $D_1$. In some embodiments, the number $N_{eq}$ is a prime number that is greater or equal to the number P of transmit paths in the transmitter 118. The sequence $D_1$ is a signal generated at the second reference ZC generation unit 209-1 according to equation (8).

The sequence $D_1$ is used as a reference signal to generate additional (P−1) ZC sequences by cyclically shifting $D_1$ with a shift step size: Step_size=$\lfloor N_{eq}/P \rfloor$, where $\lfloor N_{eq}/P \rfloor$ is the floor function applied to $N_{eq}/P$, $N_{eq}$ is a prime number that is greater or equal to the number P of transmit paths of the transmitter 118. The cyclic shift is applied by each one of the Shift units 209-2 to 209-P to generate the (P−1) ZC subsequence sequences $D_i$ based on the second reference $D_1$ sequence. The cyclic shift between two consecutive sequences from the second set of sequences (where the second set of sequences includes the second reference sequence $D_1$ and the additional ZC sequences $D_i$, for i=2 . . . P) is an integer that is smaller than or equal to the number $N_{eq}$ of FFT bins divided by the number P of transmit paths.

Thus, for each i an integer between 2 and P, the sequence $D_i$ is generated based on the following equation (9):

$$D_i = \text{circular\_shift}(D_1, i * \lfloor N_{eq}/P \rfloor). \quad \text{equation (9)}$$

Where $\lfloor N_{eq}/P \rfloor$ is the floor function as applied to $N_{eq}/P$ and the result of the floor function is an integer that is smaller than or equal to the number $N_{eq}$ of FFT bins divided by the number P of transmit paths.

Once the second set of second sequences $D_i$ has been generated it is used in combination with the first set of sequences $z_i$ to determine the training signals C(i) for i=1 . . . P.

The determination of the C(i) training signals is performed by performing the following operations:

1) Replicate each one of the $z_i$ sequences, for k=1 . . . P, $N_{eq}$ times to obtain the concatenated signals: $z_1 z_1 \ldots z_1, \ldots, z_P z_P \ldots z_P$, where each one of the $z_i z_i z_i \ldots z_i$ is formed by concatenating $N_{eq}$ times the same sequence $z_i$.

2) Multiply each concatenated sequence $z_i \ldots z_i$ by $D_i(n)$, where n=1 . . . Neq. The multiplication of a concatenated sequence with a $D_i$ sequence is performed by multiplying the entire frame of each sequence $z_i$ with a respective sample at index n of the respective Di sequence. Thus, the entire FFT frame of each first ZC sequence $z_i$ is multiplied by one symbol $D_i(n)$ of the second sequence $D_i$ thus constituting $N_{eq}$ FFT frames of length N each. Every sequence $z_i$ (i.e., the entire FFT frame forming the sequence $z_i$) from the concatenated sequence $z_i$ is multiplied by a different common phase $D_i(n)$. For example, the result of the multiplication for i=1 is:

$$z_1(1:N)*D_1(1)z_1(1:N)*D_1(2)z_1(1:N) \ldots z_1(1:N)*D_1(N_{eq}) \quad \text{equation (10).}$$

Where $z_1(1:N)$ represents the entire FFT frame of the sequence $z_1$, and $D_1(n)$ for n=1 . . . $N_{eq}$, is the sample at index n for the sequence $D_1$.

This operation is performed for each one of the first sequences $z_i$ for i=1 . . . N resulting in P orthogonal training signals as illustrated in FIG. 4. In some embodiments, where $Z_i$ are generated in the frequency domain, the multiplication $z_i \times D_i(n)$ can be done in the frequency domain, i.e. before an IFFT is applied to the sequences. In these embodiments, the IFFT is applied to the set of P training signals that result from the multiplication operation.

The P training signals obtained are orthogonal to one another in the time domain as well as in the frequency domain. The P training signals can be used to perform calibration and/or branch supervision of the antenna array. Orthogonality of the training signals in frequency domain, indicates that the same FFT bins of different signals transmitted across sub-arrays of the antenna array are orthogonal to one another. Orthogonality of the training signals in the time domain, indicates that the same FFT frame of different signals transmitted across sub-arrays of the antenna array are orthogonal to one another. The generation of training signals as described with respect to FIG. 2 and resulting in the P training signals shown in FIG. 3 allows for orthogonality of the signals with one another in the time domain as well as in the frequency domain. To achieve the orthogonality in both domain, N and $N_{eq}$ that are selected as prime numbers that are greater than or equal to the number P of transmit paths.

Figure 3:
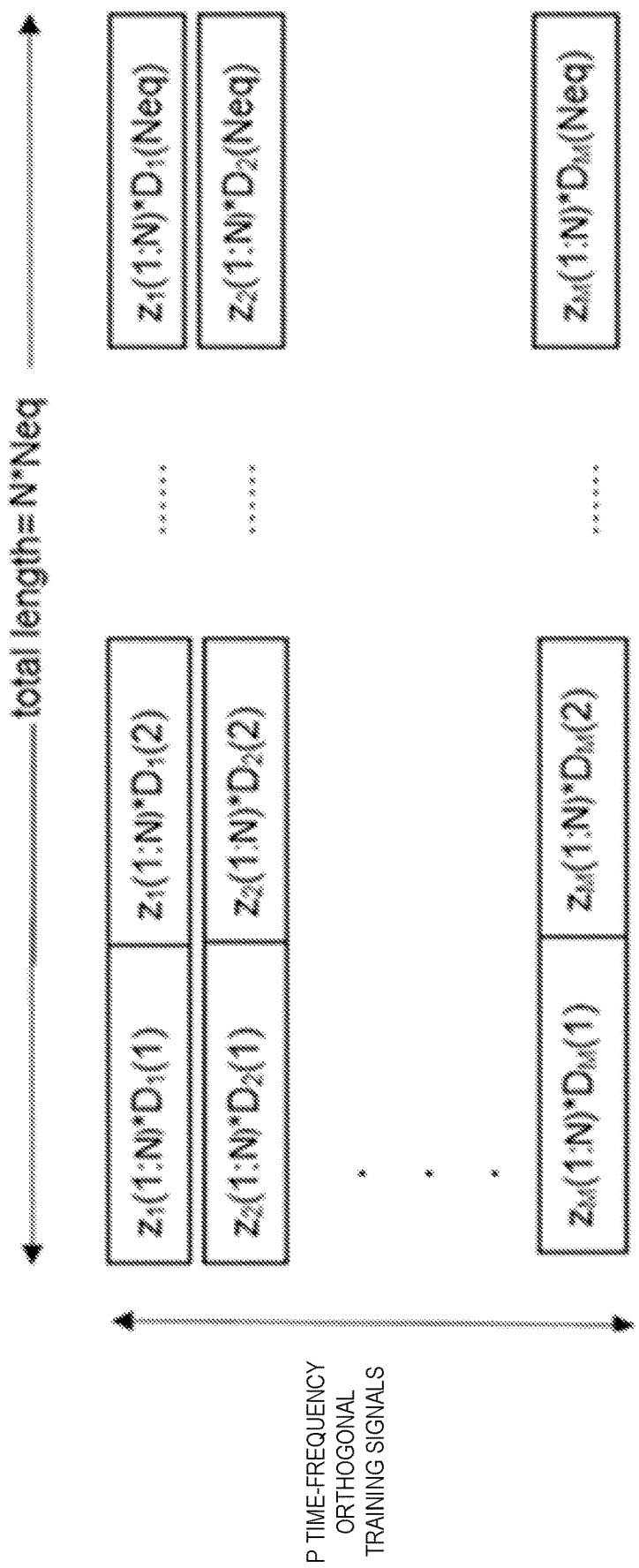
FIG. 3 illustrates exemplary P training signals obtained as a result of the replication operation a first set of ZC sequences and the multiplication of the replicated ZC sequences with a second set of ZC sequences in accordance with some embodiments.

The operations in the flow diagram of FIGS. 4A-B will be described with reference to the exemplary embodiments of FIGS. 1, 2, and 3. However, it should be understood that the operations of the flow diagrams can be performed by embodiments of the invention other than those discussed with reference to FIGS. 1, 2, and 3 and the embodiments of the invention discussed with reference to these other figures can perform operations different than those discussed with reference to the flow diagrams of FIGS. 4A-B.

Figure 4A:
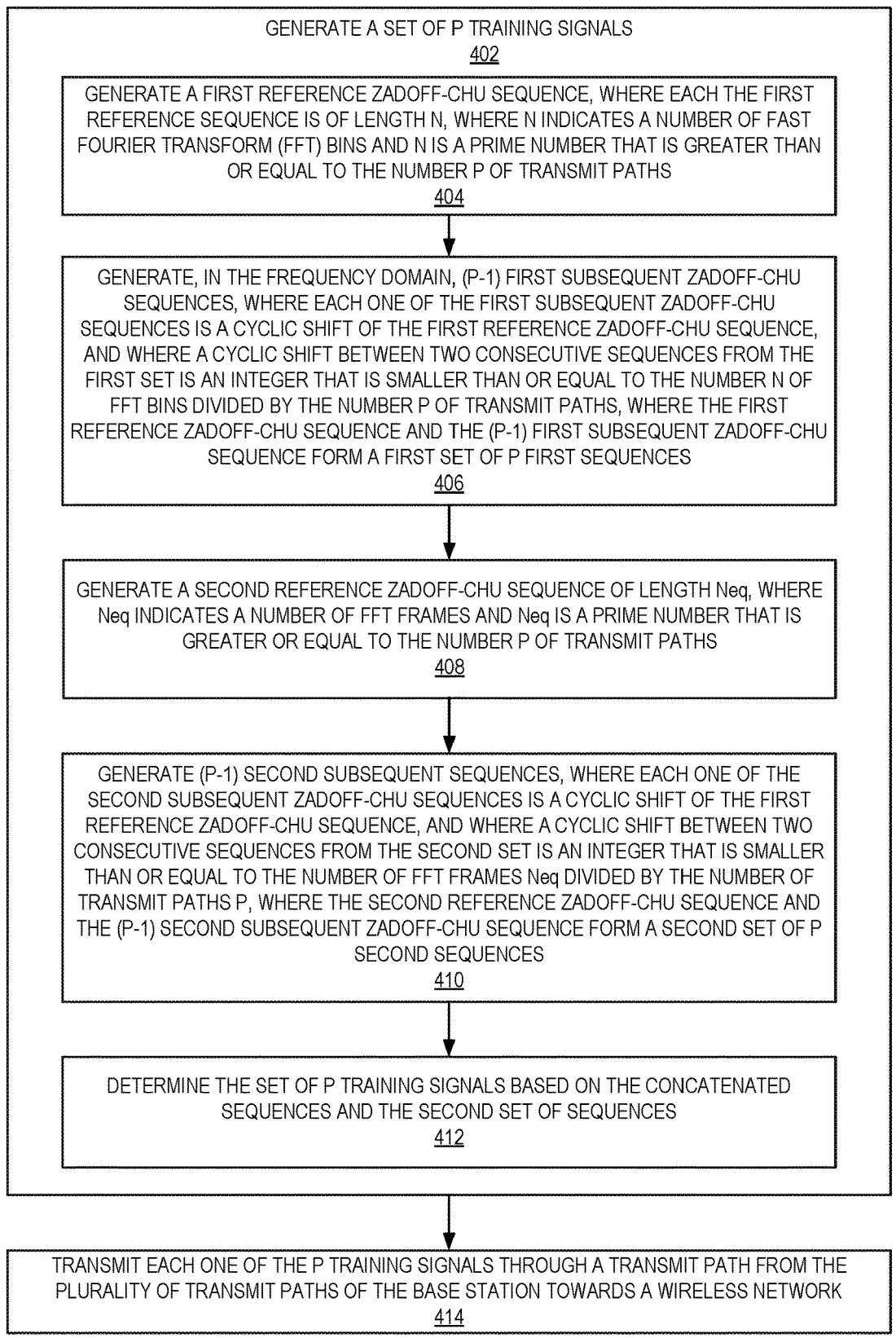
FIG. 4A illustrates a flow diagram of exemplary operations performed for generating orthogonal training signal in accordance with a first embodiment.

FIG. 4A illustrates a flow diagram of exemplary operations performed for generating orthogonal training signal in accordance with a first embodiment. The operations of the flow diagrams of FIG. 4A and FIG. 4B are performed by the OTSG 250 that is an exemplary implementation of an OTSG 150 of the transmitter 118. In some embodiments, the OTSG 250 may be part of a radio unit of the transmitter 118 or alternatively of the baseband unit of the transmitter 118 without departing from the scope of the present invention. At operation 402, a set of P training signals are generated. The operation 402 includes the operations 404 to 412. At operation 404, the OTSG 250 generates a first reference Zadoff-Chu sequence (e.g., the first ZC sequence can be generated in the frequency domain $Z_1$ or in the time domain $z_1$). The first reference Zadoff-Chu sequence is of length N, where N indicates a number of Fast Fourier Transform (FFT) bins. N is a prime number that is greater than or equal to the number P of transmit paths. In some embodiments, the first reference sequence is generated based on equation (1).

The flow of operations moves to operation 406, at which the OTSG 250 generates (P−1) subsequent first Zadoff-Chu sequences (e.g., $Z_i$). Each one of the first subsequent Zadoff-Chu sequences is a cyclic shift of the first reference Zadoff-Chu sequence, and a cyclic shift between two consecutive sequences from the first set (where the first set of sequences includes the first reference sequence and the first subsequent sequences) is an integer that is smaller than or equal to the number N of FFT bins divided by the number P of transmit paths.

At operation 408, the OTSG 250 generates a second reference Zadoff-Chu sequence $D_1$ of length $N_{eq}$. $N_{eq}$ indicates a number of FFT frames selected for the sequence $D_1$ and $N_{eq}$ is a prime number that is greater than or equal to the number P of transmit paths.

At operation 410, the OTSG 250 generates (P−1) second subsequent Zadoff-Chu sequences ($D_i$). Each one of the second subsequent Zadoff-Chu sequences is a cyclic shift of the second reference Zadoff-Chu sequence. The cyclic shift between two consecutive sequences from the second set is an integer that is smaller than or equal to the number of FFT frames $N_{eq}$ divided by the number P of sub-arrays. The second reference Zadoff-Chu sequence and the (P−1) second subsequent Zadoff-Chu sequences form a second set of P second sequences.

The flow of operations moves to operation 412, at which the OTSG 250 determines the set of P training signals based on the first sequences and the second sequences. In some embodiments, the determination of the P training signals is performed according to operations of FIG. 4B.

Once the P training signals are generated, each one of the P training signals is transmitted, operation 414, through a transmit path from the plurality of transmit paths of the base station towards a wireless network. In some embodiments, in addition to being transmitted through the transmit paths, the P training signals are transmitted to an impairment estimator (e.g., impairment estimator 770 of FIG. 7) for enabling calibration of the antenna array. In other embodiments, the P training signals may further be transmitted to a branch supervision unit that is operative to determine the status of operation of the antenna array. The orthogonality of the P training signals obtained in the frequency domain and in the time domain enable a more accurate and more efficient calibration and branch supervision processes.

Figure 4B:
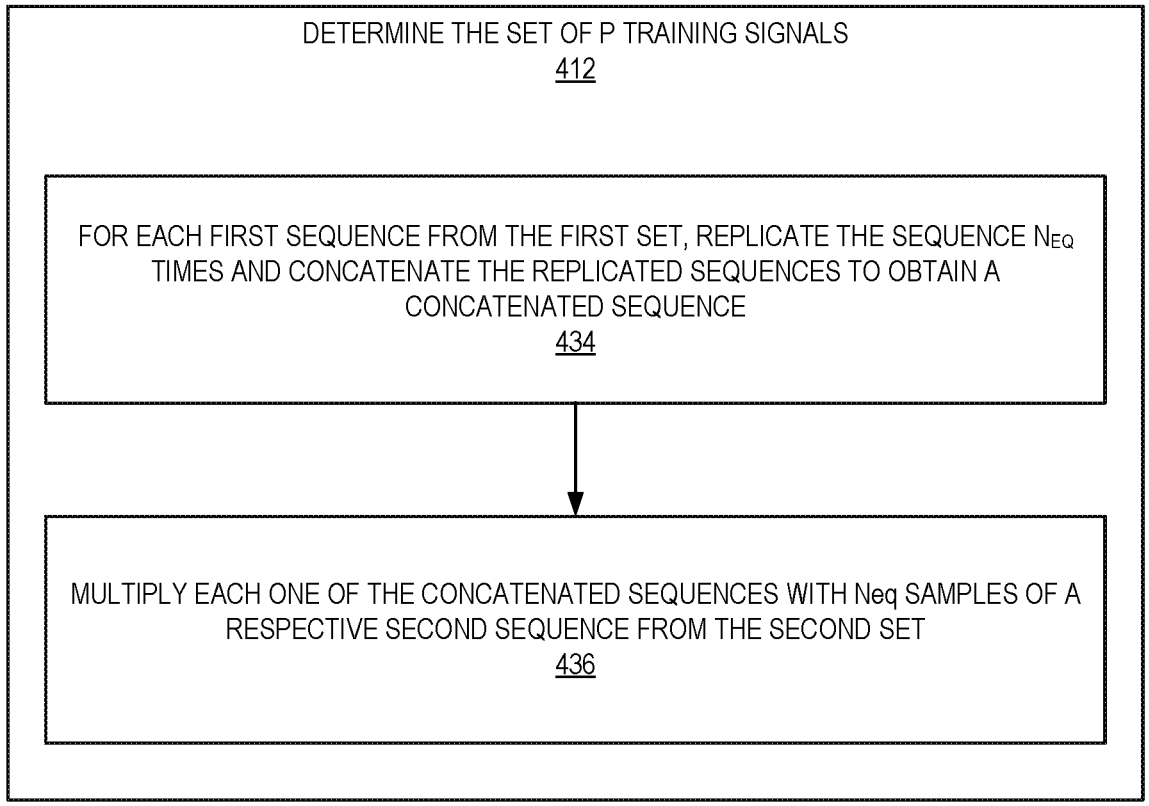
FIG. 4B illustrates a flow diagram of exemplary operations that are performed for determining the P training signals based on the first ZC sequences and the second ZC sequences in accordance with some embodiments.

FIG. 4B illustrates a flow diagram of exemplary operations that are performed for determining the P training signals based on the first ZC sequences and the second ZC sequences in accordance with some embodiments.

At operation 434, the OTSG 250 replicates, for each sequence from the first set of sequences, the sequence $N_{eq}$ times and concatenates the replicated sequences to obtain a concatenated sequence. At operation 436, the OTSG 250 multiplies each one of the concatenated sequences with $N_{eq}$ samples of a respective second sequence. FIG. 3 illustrates exemplary P training signals obtained as a result of the replication operation 434 and the multiplication operation 436.

Figure 4C:
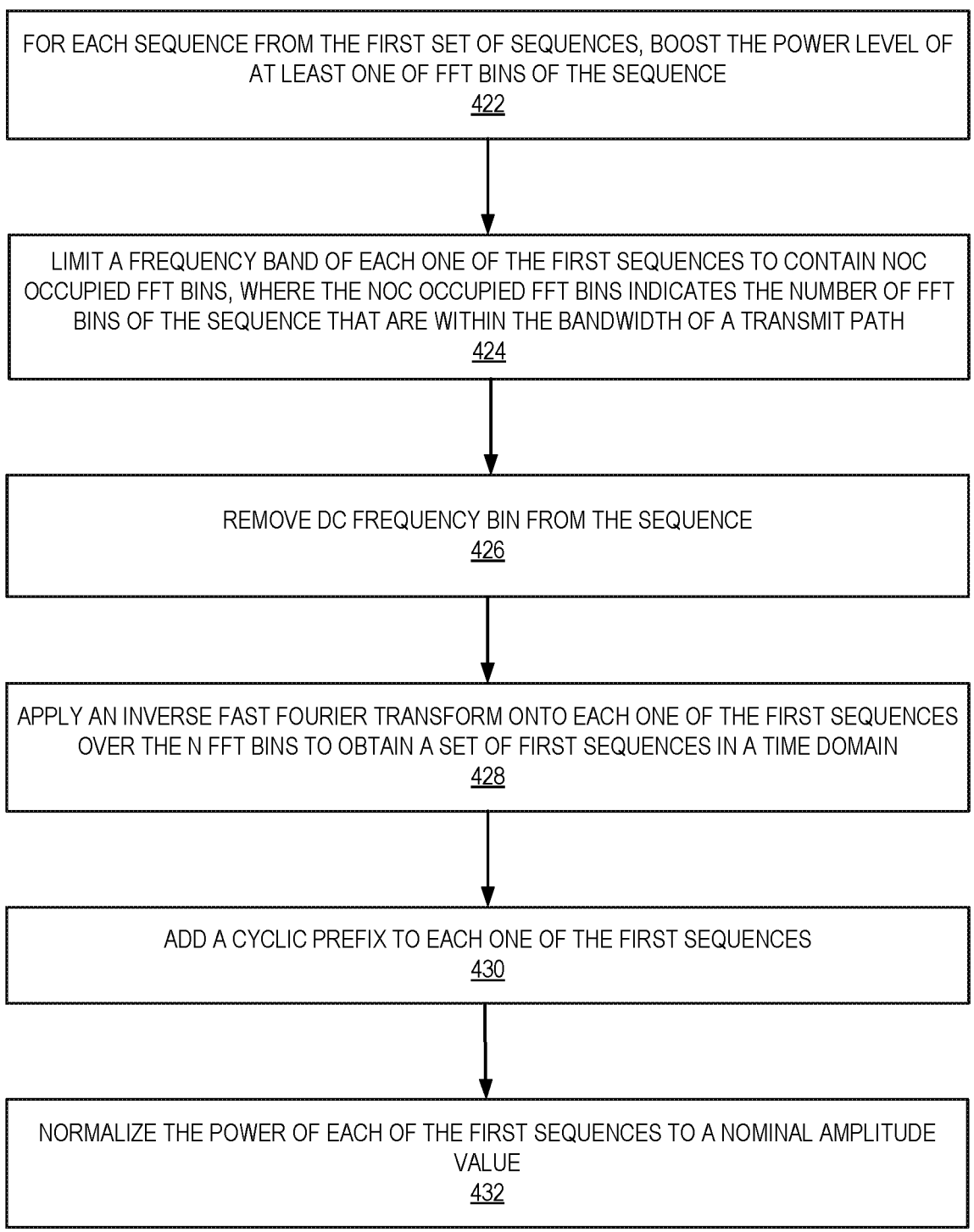
FIG. 4C is a flow diagram of exemplary operations that can be performed during generation of the P training signals in accordance with some embodiments.

FIG. 4C is a flow diagram of exemplary operations that can be performed during generation of the P training signals in accordance with some embodiments. In some embodiments, prior to determining the P training signals based on the first set of sequences $\{z_i, i=1 \ldots P\}$ and a second set of sequences $\{D_i, i=1 \ldots P\}$ several operations can be performed on each one of the first sequences $z_i$. For example, these additional operations are performed for each sequence $z_i$ by a respective one of the power boost units 202-$i$, the bandwidth limiters 203-$i$, the DC removal units 204-$i$, the cyclic prefix adder 206-$i$, and the power normalizer 207-$i$. In some embodiments, none of these operations is performed. In other embodiments, a subset or all the operations are performed without departing from the scope of the present invention.

In the following description, the operations will be described with respect to a single sequence Zi, however one of ordinary skill in the art would understand that the same operations are performed for each one of the first sequences Zi, for i=1 . . . P. At operation 422, the power level of at least one of the FFT bins of the sequence Zi is boosted. Boosting the power level of improves the signal to noise ratio of those bins. For example, in some embodiments, the FFT bins of the sequence that are close to the edges of the bandwidth occupied (Noc) are boosted.

At operation 424, the frequency band of the sequence is limited based on the Noc. As mentioned above, Noc indicates the number of FFT bins of the sequence that are within the bandwidth of a digital transmit path. The number Noc is usually narrower than the Nyquist bandwidth. In a first embodiment, when the sequence $z_i$ is generated in the time domain, the frequency band can be limited by applying a digital filter with a desired bandwidth in the time domain. Alternatively, when the sequence $Z_i$ is generated in the frequency domain, the frequency band can be limited by applying a digital filter with a desired bandwidth in digital frequency domain. For example, this can be performed by nullifying FFT bins of the sequence Zi that are outside of the occupied bandwidth and keeping the remaining of the FFT bins unchanged.

In some embodiments, the bandwidth limited 203-$i$ limits the frequency band of the sequence $Z_i$ for i=1 . . . P to contain Noc occupied FFT bins according to the following equations:

The Noc is determined based on the following equation (4)

$$Noc=[\text{Carrier\_Bandwith}*s/\text{Nyquist Sampling Rate}*N)] \quad \text{equation (4)},$$

where the carrier_bandwitdh is the bandwidth of the carrier wave of the transmit path, and s is a parameter that can have a value of 0.9. Other values of s can be contemplated.

Depending on whether Noc is even or odd, the sequence frequency band of the sequence Zi is limited according to equation (5) or equation (6) respectively:

$$Z_i=[Z_i(1:Noc/2),\text{zero}(N-Noc),Z_i(N-Noc/2+1:N)] \quad \text{equation (5)}$$

when Noc is even.

$$Z_i=[Z\_i(1:Noc+1)/2),\text{zero}(N-Noc),Z_i(N-Noc-1)/2+1:N)] \quad \text{equation (6)}$$

when Noc is odd.

Flow then moves to operation 426, at which DC FFT bin of a sequence $Z_i$ is removed. The DC removal unit 204-$i$ removes the DC FFT bin of a sequence $Z_i$ by causing the FFT bin at the index 0 of the sequence $Z_i$ to be null, i.e. $Z_i(0)=0$.

In some embodiments, as discussed above when the sequences are generated in the frequency domain, the flow of operations moves to operation 428, at which each one of the first sequences is transformed into sequences $z_i$ in the time domain.

At operation 430, a cyclic prefix (CP) is added to the sequences. The cyclic prefix is a copy of last cyclic prefix samples in the time domain signal added to the beginning of the signal (i.e., the beginning of the sequence $z_i$). At operation 432, the power of the sequences $z_i$ is normalized to a nominal amplitude value (e.g. +/−1), i.e., the amplitude of sequences $z_i$ is scaled to a defined power level.

Figure 5:
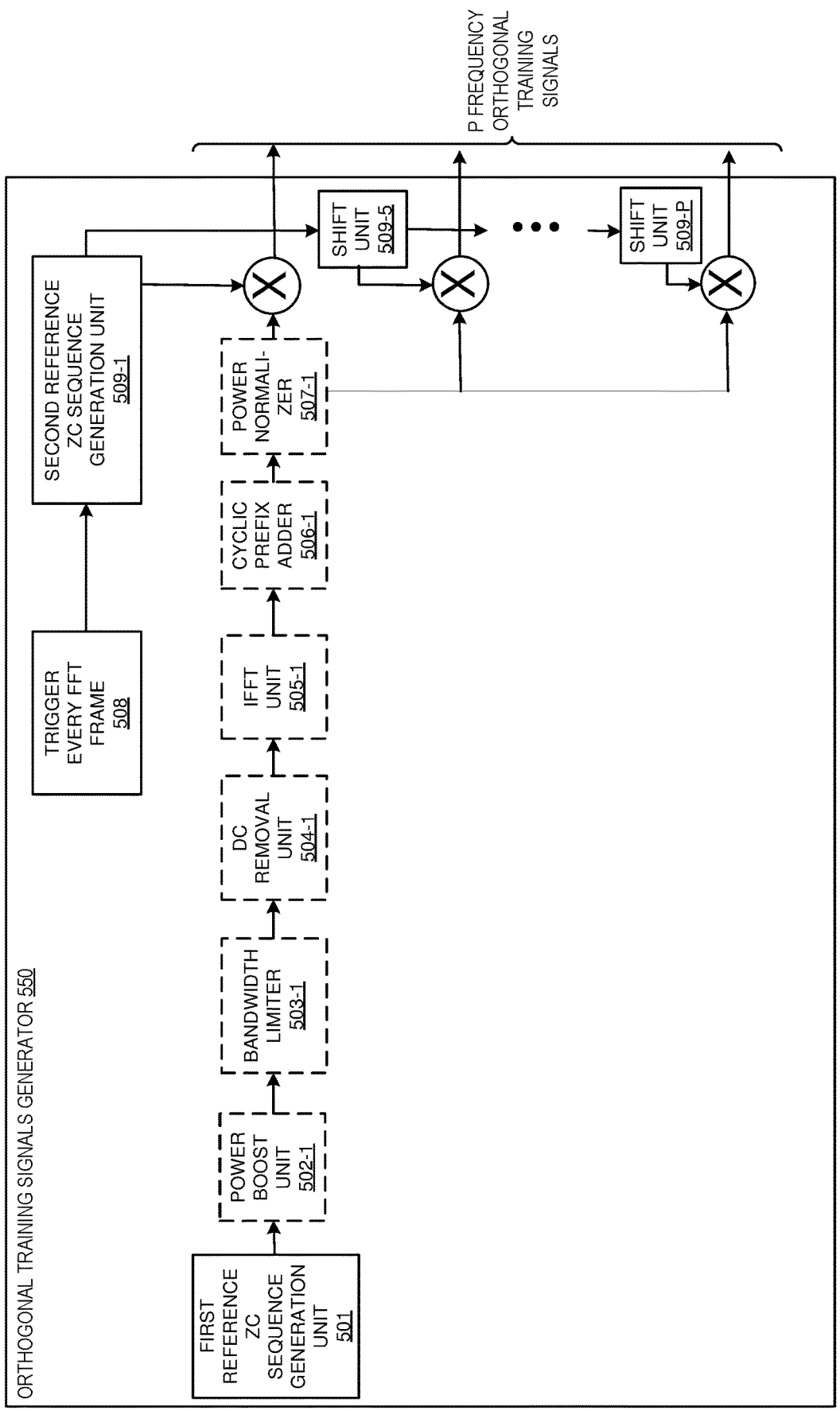
FIG. 5 illustrates a block diagram of an exemplary orthogonal training signals generator that is operative to generate P training signals that are orthogonal to one another in the frequency domain in accordance with some embodiments.

Orthogonality of the Training Signals in Frequency Domain for Antenna Array Calibration:

In some embodiments, the P training signals can be generated such that orthogonality in a single domain is achieved. FIG. 5 illustrates a block diagram of an exemplary OTSG 560 that is operative to generate P training signals that are orthogonal to one another in the frequency domain. In this embodiments, the first reference ZC sequence generation unit 501 is used in addition to a set of second sequences to generate the P training signals. The set of second sequences is generated based on a second reference ZC sequence, generated at the generation unit 509-1 and subsequent ZC sequences that are generated based on a cyclic shift of the second reference sequence. In some embodiments, the operation performed for generating the first reference sequence at the first reference ZC sequence generation unit 501 are similar to operation performed with reference to the first reference ZC generation unit 201-1 of FIG. 2. The operation performed for generating the second reference sequence at the second reference ZC sequence generation unit 509-1 are similar to operations performed with reference to the second reference ZC generation unit 209-1 of FIG. 2. The generation of the subsequent second sequences is performed based on similar operations as discussed with reference to FIG. 2 and the generation of the cyclic shifts of the second reference signal.

In these embodiments, the orthogonality in the frequency domain of the P training signals (i.e. orthogonality of the signals between the same FFT bins of these sequences across antenna array) is obtained at least by selecting an $N_{eq}$ used for generation of the second ZC sequences that is a prime number greater than or equal to the number of transmit path in the base station. In addition, to selecting the $N_{eq}$, the parameter $u_2$ of the second ZC sequence is selected to be an integer between 0 and $N_{eq}$ (i.e., $0<u_2<N_{eq}$). In some embodiments, the orthogonality of the P training signals in the frequency domain allows a more efficient calibration of the antenna array when using the P training signals.

Figure 6:
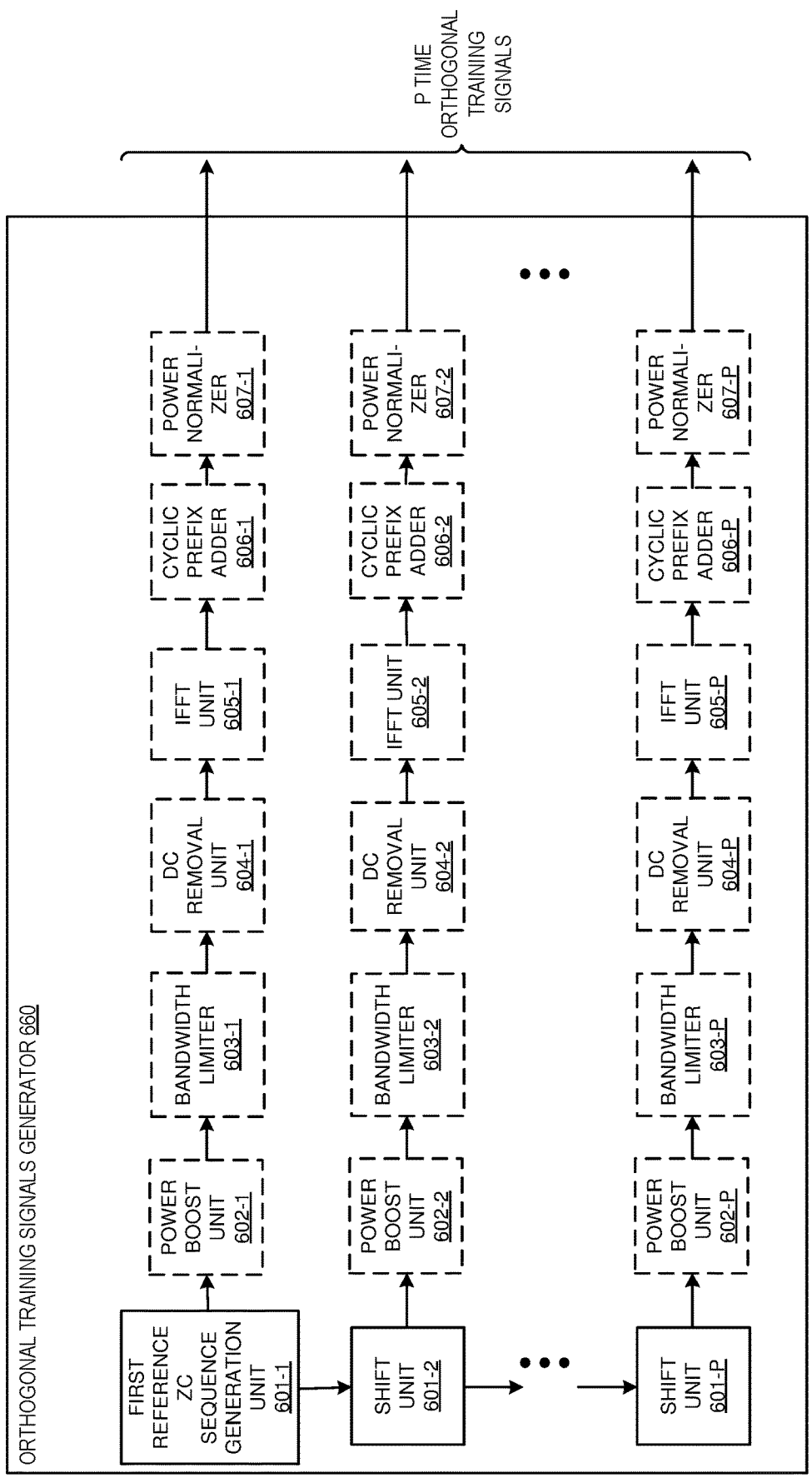
FIG. 6 illustrates a block diagram of an exemplary orthogonal training signals generator that is operative to generate P training signals that are orthogonal to one another in the time domain in accordance with some embodiments.

Orthogonality of the Training Signals in Time Domain for Antenna Array Calibration:

In some embodiments, the P training signals can be generated such that orthogonality in a single domain is achieved. FIG. 6 illustrates a block diagram of an exemplary OTSG 660 that is operative to generate P training signals that are orthogonal to one another in the time domain. In this embodiments, the first set of ZC sequences is generated based on a first reference ZC sequence (generated by the generation unit 601-1) and subsequent ZC sequences that are generated based on a cyclic shift of the first reference sequence. In this embodiment, the operation performed for generating the first reference sequence at the first reference ZC sequence generation unit 601-1 are similar to operation performed with reference to the first reference ZC generation unit 201-1 of FIG. 2. The operation performed for generating the subsequence ZC sequences at the shift units 601-2 to 601-P are similar to operations performed with reference to the first reference ZC generation unit 209-1 of FIG. 2.

In these embodiments, the orthogonality in the time domain of the P training signals (i.e. orthogonality of the signals between the same FFT frame of these sequences across antenna array) is obtained at least by selecting an N used for generation of the first ZC sequences that is a prime number greater than or equal to the number of transmit path in the base station. In addition, to selecting the N, the parameter $u_1$ of the first ZC sequence is selected to be an integer between 0 and N (i.e., $0<u_1<N$). In some embodiments, the orthogonality of the P training signals in the frequency domain allows a more efficient branch supervision of the transmit paths coupled with sub-arrays of the antenna array when using the P training signals.

Using the Orthogonal Training Signals for Antenna Array Calibration and/or Branch Supervision:

In some embodiments, the orthogonal training signals are generated and transmitted through the transmit paths of a base station towards sub-array of an antenna array to allow for branch supervision (i.e., fault detection) and/or calibration of the transmit paths. The calibration and/or branch supervision can be performed at regular intervals during the operation of the antenna array. In some embodiments, calibration of the antenna array enables at regular interval allows the system to account for changes in the environment that may affect the system (e.g., weather conditions, amount of data traffic transmitted through the antenna array, etc.).

In some embodiments, the calibration can be performed entirely within the radio unit of a base station using a feedback signal from an antenna, without involving other parts of the base station and the network. Confining the calibration within the radio unit can simplify the hardware and software design and lower the cost of the system. Moreover, the radio unit in a base station is typically multi-standard, which also means that the radio unit is agnostic to the specific radio standard (i.e., $5^{th}$ generation wireless systems (5G), $4^{th}$ generation wireless systems (4G), Long Term Evolution (LTE), Global System for Mobile Communications (GSM), Code Division Multiple Access (CDMA), Wideband CDMA (WCDMA), etc.) being implemented by the base station. Therefore, performing the calibration in the radio unit maintains the multi-standard characteristic of the base station. It is to be appreciated that embodiments of the invention are not so limited; in some embodiments, the calibration can be performed by the radio unit and other parts of the base station, e.g., the baseband unit. For example, the generation of the signals can be performed in the radio unit or alternatively in the baseband unit.

FIG. 7 illustrates an exemplary block diagram of a portion of the transmitter 114 in the base station 110 that performs antenna array calibration and/or branch supervision according to one embodiment. In this embodiment, the transmitter 114 includes a baseband unit 712 and a radio unit 710 coupled to an antenna array 118 that has multiple sub-arrays 721(1-P). The radio unit 710 is responsible for converting baseband signals into radio frequency (RF) signals for transmission. The sub-arrays 721(1-P) are operative to carry outbound signals that have been phase-controlled for transmission. The outbound signals include traffic signals. Each of the traffic signals is a "normal traffic signal" as the signal carries data or other communication information for transmission to another network node or user equipment. In some embodiments, the outbound signals may include traffic signals and training signals that were injected into the base station 110 for performing antenna array calibration. The sub-arrays 721(1-P) are coupled to the radio unit 710 of the base station 110 via respective antenna ports and corresponding radio transmit ports at the radio unit 710 (not illustrated).

Between the antenna ports and the radio transmit ports are multiple feeders (not illustrated), one for each transmit path. The term "transmit path" as used herein refers to the path traversed by a signal after the signal enters one of the transmit (Tx) chains 730(1-P), for example Tx Chain 730-1, and before the signal enters one of the sub-arrays 721(1-P). An example of a transmit path is shown in FIG. 7 by the dotted box labeled as a transmit path 729-1. The transmit path 729-1 includes a transmit (Tx) chain 730-1 and all of the interconnect including a feeder (not illustrated) up to a coupler 723-1 inside the antenna array 118. In practice the transmit path 729-1 may also include duplexers, amplifiers (e.g., tower mounted amplifiers (TMAs), combiners, diplexers, etc., such as would be appreciated by one skilled in the art. There is a one-to-one correspondence between a transmit chain and a transmit path. The transmit chains 730(1-P) are the boundary between digital processing and analog processing in the base station 110, as each one of the transmit chains 730(1-P) converts a signal from digital to analog. Each one of the transmit chain 730(1-P) includes a number of analog components, such as one or more digital-to-analog converters, mixers, filters, power amplifiers, etc.

The analog components in the transmit chains 730(1-P), together with the feeders and other components along the analog portion of the transmit paths up to the antenna ports, generally cause linear phase and/or linear amplitude impairment to the signals that traverse these paths. Significant non-linearities in the transmit path (such as the power amplifier) are typically taken care of by non-linear pre-distortion techniques.

The base station includes an orthogonal training signal generator 750 that is operative to generate P orthogonal training signals. The P training signals can be generated as described above with respect to the multiple embodiments of FIGS. 2-6. For example, the P training signals can be generated in the frequency domain as signals $C(1, m, k), \ldots, C(P, m, k)$, where m is a FFT frame index, $m=\{1, 2, \ldots, N_{eq}\}$, sample index is n and k is frequency index. The P training signals can also be generated in the time domain as signals $c(1, m, k) \ldots c(P, m, k)$. In addition, the P training signals can be generated such orthogonality in at least one of the time domain and the frequency is achieved. In some embodiments, the orthogonality is achieved in a single one of the time and frequency domain. In other embodiments, orthogonality is achieved in both domains.

The P training signals are input into the radio unit 710 to be transmitted through the respective transmit paths 729-1 to 729-P. Each of the input signals $c(i, m, n)$, where n is the time index, is a signal to be transmitted to a wireless network via one of the sub-arrays 721(1-P) by traversing a respective transmit path from the transmit paths 729(1-P). In the description herein, the lower-case letters indicate time-domain signals or values, and the upper-case letters indicate frequency-domain signals or values.

To determine the linear impairment of phase and/or amplitude affecting signals in the transmit paths, input signals $C(1, m, k), \ldots, C(P, m, k))$ are transmitted to the impairment estimator 770 when these signals are transmitted to the radio unit 710. The P training signals are sampled in m blocks of N samples per block. The signals, $C(1, m, k), \ldots, C(P, m, k)$ when entering the impairment estimator 770 have not been impaired by the components in the transmit paths, and, therefore, are suitable for determining reference signals for performing the calibration and/or branch supervision.

The training signals traverse the different components of the transmitter (e.g., the conditioning units, the equalizers, the Tx chains, the feeders) to be output as outbound signals at the subarrays 721(1-P) for transmission towards a wireless network. The outbound signals are coupled by respective couplers 723(1-P) and combined (i.e., summed up) by a combiner 722 in the antenna array 118 to produce a single feedback signal $s_{dt}(n)$. This feedback signal is routed to a feedback receiver 740 through an antenna calibration port (not illustrated) and a corresponding radio calibration port (not illustrated) at the radio unit 710.

The feedback signal $s_{dt}(n)$ is formed after each input signal has gone through the various components of the transmitter, in particular the analog part of the transmit path. Thus, the feedback signal, $s_{dt}(n)$, is a sum of the impaired signals. The calibration technique described herein uses the unimpaired reference signals $C(1, m, k), \ldots, C(P, m, k)$ and the impaired sum of these signals to estimate the impairment in the transmit path and to thereby remove the impairment from the outbound signals that is output at the antenna subarrays 721 (1-P) during a calibration process or to detect a fault in the transmit paths during a branch supervision process. In a calibration process, the impairment is removed after the equalizers 790(1-P) are programmed with equalizer taps calculated based on the estimated impairments at the equalizer synthesis unit 780. In some cases, only the differences in the impairments of the transmit paths need to be compensated for to obtain good system performance.

The feedback signal $s_{dt}(n)$ from the combiner 722 is sent to the feedback receiver 740, which removes the cyclic prefix from the feedback signal to obtain the new feedback signal $s_F(m, n)$. An FFT of the signal $s_F(m, n)$ is taken to obtain the signal $S_F(m, k)$. The impairment estimator 770 is operative to determine, based on the reference signals and the feedback signal, the impairment affecting the input signals in the transmit path.

The impairment estimator 770 aligns the feedback signal with the reference signals in time, and performs a de-convolution of the reference signals jointly with the feedback signal. The result of the de-convolution is an estimated impairment for each transmit path. As the effect of impairment is equivalent to convolving the reference signals with the impairment, the impairment may be calculated by de-convolving the reference signals with the impaired feedback signal.

In the scenario of a calibration process, based on the estimated impairment determined at the impairment estimator 770, an equalizer synthesis unit 780 computes an approximate inverse to the impairment in the frequency range occupied by the outbound traffic signals. The equalizer synthesis unit 780 produces a set of equalizer taps representative of the approximate inverse to the impairment. The equalizer synthesis unit 780 determines and sets the tap values of the corresponding equalizers 790(1-P) according to the equalizer taps. In one embodiment, each one of the equalizers 790(1-P) is a complex finite impulse response (FIR) filter with one or more taps (i.e., equalizer taps). The finite impulse response is an approximate inverse to the impairment that occurs in the corresponding transmit path from a transmit chain 730 to the antenna port that couples the radio unit 710 to the antenna array 118. As such, each outbound traffic signal processed by one of the equalizer 790(1-P) is pre-distorted such that the pre-distortion cancels out the impairment in the transmit path.

Although FIG. 7 shows that the calibration functions are performed entirely in the radio unit 710, some or all of the calibration functions can be performed in the baseband unit 712 of the base station 110. In some embodiments, the calibration functions may be performed in the radio unit 710, the baseband unit 712, and/or other portions of the base station 110.

In the scenario of branch supervision, based on the estimated impairment determined at the impairment estimator 770, a transmit path fault manager 772 estimates performance metrics related to each one of the transmit path and may determine whether or not a fault has occurred in the transmit path. In some embodiments, the transmit fault manager 772 is operative to transmit results of the analysis to a higher level entity such as an administrator of the system (e.g., through a backend network and a graphical user interface) to inform of the fault that occurred in the transmit path(s).

In one embodiment, the impairment estimation and equalization are performed in a continuous loop, where the feedback signal and training signals are continuously captured over time and are continuously used to refine the equalizer taps and perform the branch supervision. The computation of impairment estimation and equalization can be performed offline or in real-time. For example training signals transmitted over a period of time may be used in offline processing in order to obtain an accurate impairment estimation and equalization. Alternatively, real-time processing may be more responsive to changes in operating conditions. In some embodiments, the base station 110 may dynamically switch between offline and real-time processing based on the current operating conditions. In some embodiments, the P training signals can be injected into the transmit branches at regular intervals (e.g., every 10 sec to perform branch supervision and/or branch calibration). In some embodiments, the branch supervision can be performed on different intervals than the calibration. For example, calibration can be performed more often than branch supervision and vice-versa.

Figure 8:
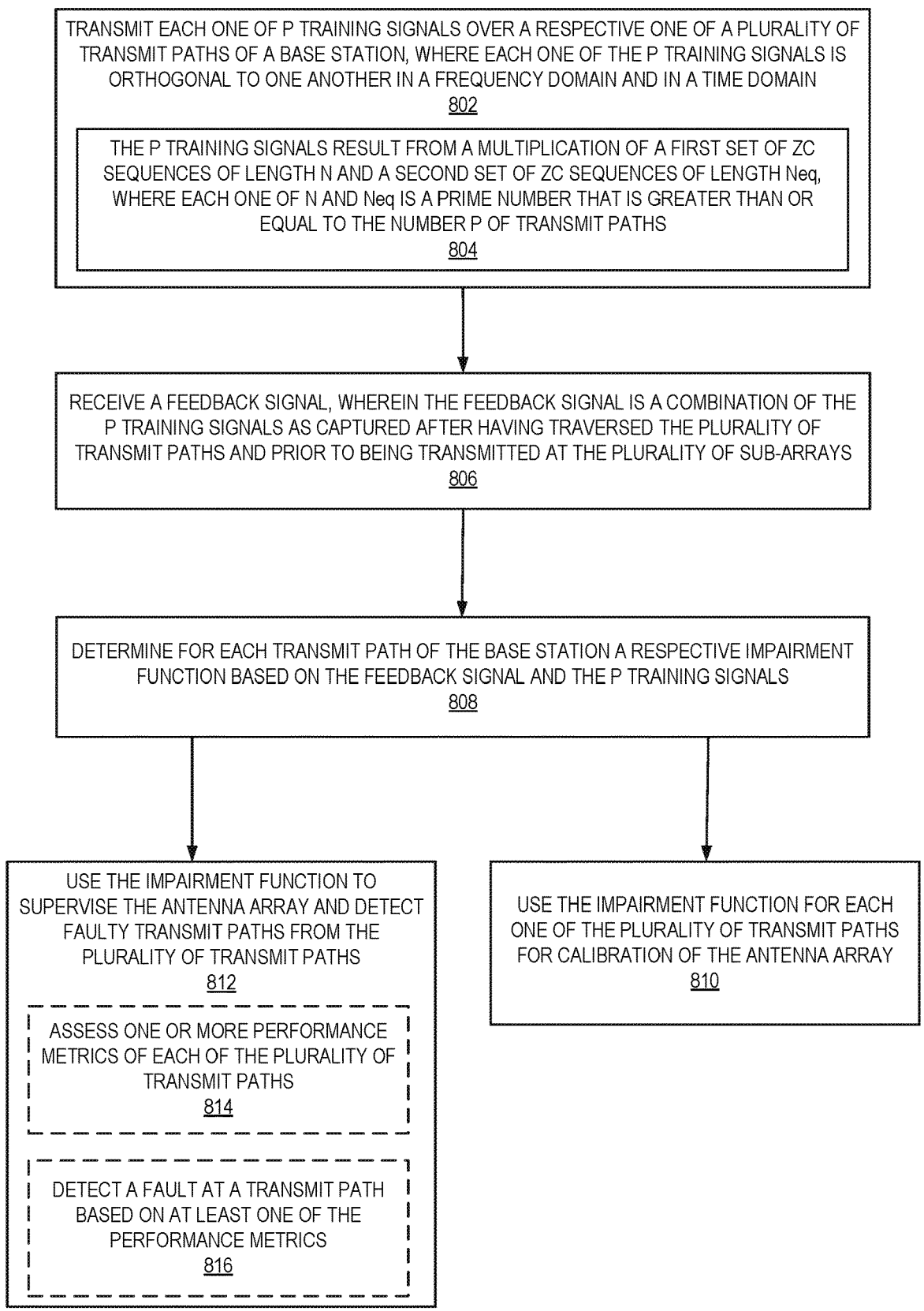
FIG. 8 illustrates a flow diagram of exemplary operations for using the training signals to perform calibration and/or branch supervision of the transmit paths of a base station in accordance with some embodiments.

FIG. 8 illustrates a flow diagram of exemplary operations for using the training signals to perform calibration and/or branch supervision of the transmit paths of a base station in accordance with some embodiments. The operations in the flow diagram can be performed by embodiments described with respect to FIGS. 1-7. However, it should be understood that the operations of the flow diagram can be performed by embodiments of the invention other than those discussed with reference to FIGS. 1-7 and the embodiments of the invention discussed with reference to these other figures can perform operations different than those discussed with reference to the flow diagram of FIG. 8.

At operation 802, each of one of P training signals is transmitted over a respective one of multiple transmit paths of a base station. The training signals are orthogonal to one another in at least one of the frequency and the time domains. In some embodiments, the training signals are orthogonal to one another in both the frequency and the time domain. In some embodiments, the training signals result, operation 804, from a multiplication a first set of ZC sequences of length N and a second set of ZC sequences of length $N_{eq}$, where each of N and $N_{eq}$ is a prime number that is greater than or equal to the number P of transmit paths. In some embodiments, the training signals are generated within the base stations (within the radio unit or alternatively within the baseband unit), for example with an orthogonal training signal generator (e.g., OTSG 250, 550, or 650). In other embodiments, the training signals can be generated outside the base station and stored at the base station to be transmitted for performing calibration and/or branch supervision. In these examples, the OTSG can be located on a network device coupled with the base station and that is operative to transmit the generated training signals to be stored at the base station. While the embodiments, described above with reference to FIG. 1 illustrates an OTSG 150 that is located within the base station 110, this should not be regarded as a limitation of the present invention. In some embodiments, the oTSG may be outside the base station and coupled to the base station through a network. In these embodiments, the base station is operative to store the generated training signals and use them for performing any of a calibration process and/or branch supervision process of the antenna array.

At operation 806, a feedback signal is received. For example, the feedback signal is received at the impairment estimator 770. The feedback signal is a combination of the P training signals as captured after having traversed the plurality of transmit paths and prior to being transmitted at the plurality of sub-arrays of an antenna array. At operation 808, for each transmit path of the base station a respective impairment function is determined based on the feedback signal and the P training signals. The orthogonality of the training signals in at least one of the time domain and the frequency domain enable to perform an efficient calibration and/or branch supervision.

The impairment function can be used to enable calibration and/or branch supervision of the transmit paths coupled with the sub-arrays of the antenna array. In some embodiments, the flow of operations moves to operation 810, at which the impairment function determined for each one of the plurality of transmit paths is used for calibration of these paths. In other embodiments, the flow of operations moves to operation 812, at which the impairment function is used to supervise the antenna array and detect faulty transmit paths from the plurality of transmit paths. In some embodiments, the branch supervision can be performed by assessing, at operation 814, one or more performance metrics, such as power, noise floor, Error Vector Magnitude (EVM), Signal to Noise Ratio (SNR), etc. The branch supervision further includes detecting, at operation 816, based on at least one of the performance metrics a fault at a transmit path.

Impairment Function Based on the Feedback Signal the and P Orthogonal Training Signals:

The operations below will be described with reference to FIG. 7 with the assumption that the number of transmit paths P=4. Upon receipt of the feedback signal $S_F(m,n)$ and the training signals $C(1,m,k) \ldots C(4,m,k)$, the impairment estimator 770 determines linear equations for each bin k, FFT frame index m.

The linear equation for each frequency bin k, FFT frame index m and P=4 can be written as follows:

$$C(1,m,k)H_d(1,k)+C(2,m,k)H_d(2,k)+C(2,m,k)H_d(2,k)+C(3,m,k)H_d(3,k)+C(4,m,k)H_d(4,k)=S_F(m,k)$$

where $H_d(i, k)$ is the transfer function in the frequency domain between the training signals and the feedback signal. The number of FFT frames $N_{eq}$ determines the number of linear equations.

This linear equation has four unknown coefficients $H_d(i, k)$ for the P transmit paths (that is, one impairment value for each transmit path). In order to solve for $H_d(i, k)$, four or more independent equations are needed, when P=4. This can be achieved by using different FFT frames with index m={1, 2, ..., 4}. The equations in matrix form for each frequency bin k is as follows:

$$C(k)H_d(k)=S_F(k)$$

where $$C(k) = \begin{bmatrix} C(1,1,k) & \cdots & C(4,1,k) \\ C(1,2,k) & \ddots & C(4,2,k) \\ \vdots & & \vdots \\ C(1,M,k) & \cdots & C(4,M,k) \end{bmatrix}$$

$$H_d(k) = \begin{bmatrix} H_d(1,k) \\ H_d(2,k) \\ \vdots \\ H_d(4,k) \end{bmatrix}$$

$$S_F(k) = \begin{bmatrix} S_F(1,k) \\ S_F(2,k) \\ \vdots \\ S_F(4,k) \end{bmatrix}$$

The estimated impairment vector for each frequency bin k is then, $H_d(k)=C^+(k)S_F(k)$ where $C^+(k)=[C^H(k)C(k)]^{-1}C^H(k)$ is the pseudo inverse of C and H is the Hermitian (conjugate transpose). The orthogonality of the training signals in the time domain and in the frequency domain causes $C^H(k)C(k)=I$, where I is the identity matrix. Thus $C^+(k)=[C^H(k)C(k)]^{-1}C^H(k)$ simplify to $C^+(k)=C^H(k)$. The impairment estimation is then:

$$H_d(k)=C^H(k)S_F(k).$$

Thus, as shown above the determination of the impairment function is greatly simplified thus saving significant computational and storage resources at the impairment estimator which can enable a faster calibration and branch supervision of the transmit paths of the base station.

The embodiments of the present invention described herein enable calibration techniques and branch supervision techniques that have several advantages when compared with existing calibration techniques. The use of the orthogonal training signals the inversion of matrix or pseudo inversion of matrix that was previously required for the solution of the transfer function is eliminated saving computation time and memory. Further, only two sets of Zadoff-Chu sequences are used to solve the transfer function of all the transmit paths which greatly simplifies the implementation of the impairment function estimation and minimize the memory needed. The orthogonality of the training signals provides improved measures of signal-to-interference-plus-noise ratio (SINR) for the estimation of the transfer function. The set of training signals can be used for both antenna calibration and branch supervision. Each of the training signals has a low peak to average power ratio (i.e. the signals are well behaved time response for use in a transmit chains). In some embodiments, the training signals are generated in the frequency domain, which ensures a good signal level for a transfer function estimation across frequency.

In one embodiment, the calibration and branch supervision can be performed entirely within the radio unit of a base station using a feedback signal from an antenna and the orthogonal training signals, without involving other parts of the base station and the network. Confining the calibration and/or branch supervision within the radio unit can simplify the hardware and software design and lower the cost of the system. Moreover, the radio unit in a base station is typically multi-standard, which also means that the radio unit is agnostic to the specific radio standard (i.e., $5^{th}$ generation wireless systems (5G), $4^{th}$ generation wireless systems (4G), Long Term Evolution (LTE), Global System for Mobile Communications (GSM), Code Division Multiple Access (CDMA), Wideband CDMA (WCDMA), etc.) being implemented by the base station. Therefore, performing the calibration in the radio unit maintains the multi-standard characteristic of the base station. It is to be appreciated that embodiments of the invention are not so limited; in some embodiments, the calibration can be performed by the radio unit and other parts of the base station, e.g., the baseband unit. However, the digital circuitry in the baseband unit is generally multi-standard in hardware, but typically uses unique software and configuration specific to each radio standard. Moreover, performing the calibration in the radio unit and the baseband unit may incur additional interconnects and coordination between these two units. Therefore, performing the calibration in the baseband unit or multiple units of the base station may be more costly than performing the calibration entirely in the radio unit. The calibration technique described herein may be implemented in both time-division duplex (TDD) and frequency-division duplex (FDD) systems.

Architecture:

Different embodiments of the invention may be implemented using different combinations of software, firmware, and/or hardware. Thus, the techniques shown in the figures can be implemented using code and data stored and executed on one or more electronic devices (e.g., an end station, a network device). Such electronic devices store and transmit (internally and/or with other electronic devices over a network) code (composed of software instructions) and data using computer-readable media, such as non-transitory tangible computer-readable media (e.g., computer-readable storage media such as magnetic disks; optical disks; read only memory; flash memory devices) and transitory computer-readable transmission media (e.g., electrical, optical, acoustical or other form of propagated signals—such as carrier waves, infrared signals). In addition, such electronic devices typically include a set of one or more processors coupled to one or more other components, such as one or more non-transitory machine-readable media (to store code and/or data), user input/output devices (e.g., a keyboard, a touchscreen, and/or a display), and network connections (to transmit code and/or data using propagating signals). The coupling of the set of processors and other components is typically through one or more busses and bridges (also termed as bus controllers). Thus, a non-transitory computer-readable medium of a given electronic device typically stores instructions for execution on one or more processors of that electronic device. One or more parts of an embodiment of the invention may be implemented using different combinations of software, firmware, and/or hardware.

In some embodiments, the generation of the training signals can be performed on a dedicated hardware component such as a Field-Programmable Gate Array (FPGA) or an application-specific integrated circuit (ASIC), or a general purpose processor. The generation of the orthogonal training signals can be performed within or outside of a base station.

As used herein, a network device (e.g., a router, switch, bridge, controller, base station) is a piece of networking equipment, including hardware and software that communicatively interconnects other equipment on the network (e.g., other network nodes, user equipment, etc.). Some network nodes are "multiple services network nodes" that provide support for multiple networking functions (e.g., routing, bridging, switching, Layer 2 aggregation, session border control, Quality of Service, and/or subscriber management), and/or provide support for multiple application services (e.g., data, voice, and video).

While the invention has been described in terms of several embodiments, those skilled in the art will recognize that the invention is not limited to the embodiments described; it can be practiced with modification and alteration within the scope of the appended claims. The description is thus to be regarded as illustrative instead of limiting.

What is claimed is:

1. A method in a base station including a plurality of P transmit paths coupled with a plurality of sub-arrays of an antenna array for transmitting signals to a wireless network, the method comprising:
generating a set of P training signals, wherein generating the set of P training signals includes:
generating a first reference Zadoff-Chu sequence, wherein the first reference Zadoff-Chu sequence is of length N, wherein N indicates a number of Fast Fourier Transform (FFT) bins and N is a prime number that is greater than or equal to the number P of transmit paths;
generating P−1 first subsequent Zadoff-Chu sequences, wherein each one of the first subsequent Zadoff-Chu sequences is a cyclic shift of the first reference Zadoff-Chu sequence, and wherein a cyclic shift between two consecutive sequences from the first set is an integer that is smaller than or equal to the number N of FFT bins divided by the number P of transmit paths, wherein the first reference Zadoff-Chu sequence and the P−1 first subsequent Zadoff-Chu sequences form a first set of P first sequences;
generating a second reference sequence of length Neq, wherein Neq indicates a number of FFT frames and Neq is greater than or equal to the number P of transmit paths;
generating P−1 second subsequent sequences, wherein the second reference sequence and the P−1 second subsequent sequences form a second set of P second sequences; and
determining the set of P training signals based on the first set of first sequences and the second set of second sequences, wherein the P training signals are orthogonal to one another in time and frequency domains; and
transmitting each one of the P training signals through a transmit path from the plurality of transmit paths of the base station.

2. The method of claim 1, wherein the second reference sequence is a Zadoff-Chu sequence and Neq is a prime number that is greater than or equal to the number P of transmit paths.

3. The method of claim 2, wherein a cyclic shift between two consecutive sequences from the second set is an integer that is smaller than or equal to the number of FFT frames Neq divided by the number P of transmit paths.

4. The method of claim 1, wherein determining the set of P training signals includes:
for each first sequence from the first set, replicating the sequence Neq times and concatenating the replicated sequences to obtain a concatenated sequence; and
multiplying each one of the concatenated sequences with Neq samples of a respective second sequence from the second set.

5. The method of claim 1 further comprising:
for each sequence from the first set of sequences, boosting a power level of at least one of FFT bins of the sequence.

6. The method of claim 1 further comprising:
limiting a frequency band of each one of the first sequences to contain Noc occupied FFT bins, wherein the Noc occupied FFT bins indicates the number of FFT bins of the sequence that are within a bandwidth of a transmit path.

7. The method of claim 1 further comprising:
applying an inverse FFT (IFFT) onto each one of the first sequences over the N FFT bins to obtain a set of first sequences in a time domain.

8. The method of claim 1, further comprising:
normalizing power of each of the first sequences to a nominal average power value.

9. The method of claim 1, further comprising:
receiving a feedback signal, wherein the feedback signal is a combination of the P training signals as captured after having traversed the plurality of transmit paths and prior to being transmitted at the plurality of sub-arrays; and
determining for each transmit path of the base station a respective impairment function based on the feedback signal and the P training signals.

10. The method of claim 9, further comprising using the impairment function for each one of the plurality of transmit paths for calibration of the antenna array.

11. The method of claim 9, further comprising:
using the impairment function to supervise the antenna array and detect faulty transmit paths from the plurality of transmit paths.

12. A base station including a plurality of P transmit paths coupled with a plurality of sub-arrays of an antenna array for transmitting signals to a wireless network, the base station comprising:
an orthogonal training signal generator to generate a set of P training signals, wherein to generate the set of P training signals comprises operations to:
generate a first reference Zadoff-Chu sequence, wherein the first reference Zadoff-Chu sequence is of length N, wherein N indicates a number of Fast Fourier Transform (FFT) bins and N is a prime number that is greater than or equal to the number P of transmit paths;
generate P−1 first subsequent Zadoff-Chu sequences, wherein each one of the first subsequent Zadoff-Chu sequences is a cyclic shift of the first reference Zadoff-Chu sequence, and wherein a cyclic shift between two consecutive sequences from the first set is an integer that is smaller than or equal to the number N of FFT bins divided by the number P of transmit paths, wherein the first reference Zadoff-Chu sequence and the P−1 first subsequent Zadoff-Chu sequences form a first set of P first sequences;
generate a second reference sequence of length Neq, wherein Neq indicates a number of FFT frames and Neq is greater than or equal to the number P of transmit paths;
generate P−1 second subsequent sequences, wherein the second reference sequence and the P−1 second subsequent sequences form a second set of P second sequences; and
determine the set of P training signals based on the first set of first sequences and the second set of second sequences, wherein the P training signals are orthogonal to one another in time and frequency domains; and a transmitter to transmit each one of the P training signals through a transmit path from the plurality of transmit paths of the base station.

13. The base station of claim 12, wherein the second reference sequence is a Zadoff-Chu sequence and Neq is a prime number that is greater than or equal to the number P of transmit paths.

14. The base station of claim 13, wherein a cyclic shift between two consecutive sequences from the second set is an integer that is smaller than or equal to the number of FFT frames Neq divided by the number P of transmit paths.

15. The base station of claim 12, where to determine the set of P training signals includes:

for each first sequence from the first set, replicate the sequence Neq times and concatenate the replicated sequences to obtain a concatenated sequence; and multiply each one of the concatenated sequences with Neq samples of a respective second sequence from the second set.

16. The base station of claim 12, wherein the orthogonal training signal generator is further to, for each sequence from the first set of sequences, boost a power level of at least one of FFT bins of the sequence.

17. The base station of claim 12, wherein the orthogonal training signal generator is further to limit a frequency band of each one of the first sequences to contain Noc occupied FFT bins, wherein the Noc occupied FFT bins indicates the number of FFT bins of the sequence that are within a bandwidth of a transmit path.

18. The base station of claim 12, wherein the orthogonal training signal generator is further to apply an inverse FFT (IFFT) onto each one of the first sequences over the N FFT bins to obtain a set of first sequences in a time domain.

19. The base station of claim 12, wherein the orthogonal training signal generator is further to normalize power of each of the first sequences to a nominal average power value.

20. The base station of claim 12, wherein the orthogonal training signal generator is further to:

receive a feedback signal, wherein the feedback signal is a combination of the P training signals as captured after having traversed the plurality of transmit paths and prior to being transmitted at the plurality of sub-arrays; and determine for each transmit path of the base station a respective impairment function based on the feedback signal and the P training signals.

21. The base station of claim 20, wherein the orthogonal training signal generator is further to use the impairment function for each one of the plurality of transmit paths for calibration of the antenna array.

22. The base station of claim 20, wherein the orthogonal training signal generator is further to use the impairment function to supervise the antenna array and detect faulty transmit paths from the plurality of transmit paths.

* * * * *